US012776018B2

(12) United States Patent
Gnanasambandam et al.

(10) Patent No.: US 12,776,018 B2
(45) Date of Patent: Oct. 27, 2026

(54) PARALLEL TONE MAPPING IN HIGH-RESOLUTION IMAGING SYSTEMS

(71) Applicant: Samsung Electronics Co., Ltd., Suwon-si (KR)

(72) Inventors: Abhiram Gnanasambandam, Frisco, TX (US); John W. Glotzbach, Allen, TX (US); Zeeshan Nadir, Allen, TX (US); Gunawath Dilshan Godaliyadda, Allen, TX (US); John Seokjun Lee, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 18/485,970

(22) Filed: Oct. 12, 2023

(65) Prior Publication Data

US 2024/0257325 A1 Aug. 1, 2024

Related U.S. Application Data

(60) Provisional application No. 63/441,319, filed on Jan. 26, 2023, provisional application No. 63/441,327, filed on Jan. 26, 2023.

(51) Int. Cl.

| | |
|---|---|
| ***G06T 5/94*** | (2024.01) |
| ***G06T 3/4015*** | (2024.01) |
| ***G06T 15/50*** | (2011.01) |

(52) U.S. Cl.

CPC .............. *G06T 5/94* (2024.01); *G06T 3/4015* (2013.01); *G06T 15/506* (2013.01)

(58) Field of Classification Search

None

See application file for complete search history.

(56) References Cited

U.S. PATENT DOCUMENTS

| | | | | |
|---|---|---|---|---|
| 7,164,397 | B2 | 1/2007 | Pettitt et al. | |
| 9,741,099 | B2 | 8/2017 | Lim et al. | |
| 9,959,604 | B2 | 5/2018 | Chen et al. | |
| 10,229,484 | B2 | 3/2019 | Roffet et al. | |
| 10,530,995 | B2 * | 1/2020 | Douady-Pleven ... | H04N 1/4074 |
| 10,535,125 | B2 | 1/2020 | Chen et al. | |

(Continued)

FOREIGN PATENT DOCUMENTS

| | | | |
|---|---|---|---|
| CN | 115063333 | A | 9/2022 |
| CN | 115314617 | A | 11/2022 |

(Continued)

OTHER PUBLICATIONS

Supplementary European Search Report dated Oct. 30, 2025 in connection with European Patent Application No. 24747014.9, 10 pages.

(Continued)

*Primary Examiner* — Tahmina N Ansari

(57) ABSTRACT

A method includes obtaining multiple image frames captured using at least one imaging sensor. The method also includes generating a local tone map, a global tone map look-up table (LUT), and one or more contrast enhancement LUTs based on at least one of the image frames and one or more parameters of the at least one imaging sensor. The method further includes generating a blended and demosaiced image based on the image frames and generating a local tone mapped image based on the blended and demosaiced image and the local tone map. The method also includes adjusting color saturation based on the local tone mapped image to generate a corrected image. In addition, the method includes generating an output image based on the corrected image, the global tone map LUT, and the one or more contrast enhancement LUTs.

20 Claims, 13 Drawing Sheets

(56) References Cited

U.S. PATENT DOCUMENTS

| | | | |
|---|---|---|---|
| 10,708,564 B2 | 7/2020 | Park et al. | |
| 11,195,247 B1 | 12/2021 | Blasinski et al. | |
| 11,218,630 B2 * | 1/2022 | Douady | H04N 23/80 |
| 11,317,070 B2 | 4/2022 | Guerin et al. | |
| 11,430,094 B2 | 8/2022 | Zhen et al. | |
| 11,995,809 B2 * | 5/2024 | Ivanov | G06T 5/40 |
| 2015/0071537 A1 | 3/2015 | Lim et al. | |
| 2017/0223267 A1 | 8/2017 | Dabral et al. | |
| 2018/0097992 A1 * | 4/2018 | Douady-Pleven | G06T 5/50 |
| 2019/0370946 A1 | 12/2019 | Samadani et al. | |
| 2020/0260001 A1 * | 8/2020 | Douady-Pleven | H04N 9/68 |
| 2021/0012755 A1 | 1/2021 | Narasimha et al. | |
| 2021/0264579 A1 | 8/2021 | Gresset et al. | |
| 2022/0101503 A1 * | 3/2022 | Ivanov | G06T 5/40 |
| 2023/0052082 A1 | 2/2023 | Pekkucuksen et al. | |
| 2023/0252611 A1 | 8/2023 | Godaliyadda et al. | |
| 2024/0257325 A1 * | 8/2024 | Gnanasambandam | G06T 5/40 |

FOREIGN PATENT DOCUMENTS

| | | | |
|---|---|---|---|
| JP | 2007180851 | A | 7/2007 |
| JP | 2021132244 | A | 9/2021 |
| KR | 20200093694 | A | 8/2020 |
| KR | 20210091704 | A | 7/2021 |
| WO | 2021223540 | A1 | 11/2021 |
| WO | 2022094945 | A1 | 5/2022 |
| WO | 2022181995 | A1 | 9/2022 |

OTHER PUBLICATIONS

Hasinoff et al., "Burst photography for high dynamic range and low-light imaging on mobile cameras," ACM Trans. Graph., vol. 35, No. 6, Article 192, Nov. 2016, 12 pages.
Mertens et al., "Exposure Fusion," 15th Pacific Conference on Computer Graphics and Applications, 2007, 9 pages.
International Search Report and Written Opinion of the International Searching Authority dated Apr. 9, 2024 in connection with International Patent Application No. PCT/IB2024/050180, 8 pages.
International Search Report and Written Opinion of the International Searching Authority dated May 15, 2023 in connection with International Patent Application No. PCT/KR2023/001803, 10 pages.
Adobe Inc., "Digital Negative (DNG) Specification," Version 1.6.0.0, Dec. 2021, 109 pages.
Wikipedia, "Adaptive histogram equalization," Oct. 2022, 12 pages.

* cited by examiner

PARALLEL TONE MAPPING IN HIGH-RESOLUTION IMAGING SYSTEMS

CROSS-REFERENCE TO RELATED APPLICATION AND PRIORITY CLAIM

This application claims priority under 35 U.S.C. § 119(e) to U.S. Provisional Patent Application No. 63/441,327 filed on Jan. 26, 2023 and to U.S. Provisional Patent Application No. 63/441,319 filed on Jan. 26, 2023. Both of these provisional applications are hereby incorporated by reference in their entirety.

TECHNICAL FIELD

This disclosure relates generally to imaging systems. More specifically, this disclosure relates to tone mapping in high-resolution imaging systems.

BACKGROUND

Many mobile electronic devices, such as smartphones and tablet computers, include cameras that can be used to capture still and video images. While convenient, cameras on mobile electronic devices typically suffer from a number of shortcomings. For instance, the resolution of cameras included in various mobile electronic devices has increased significantly in recent years. While this may be desirable as it can increase the quality of images captured using the cameras, the use of higher resolutions also comes with various drawbacks. As one particular example, while it is possible to repurpose existing image signal processing (ISP) pipelines for use with high-resolution cameras, it may take an undesirable amount of time and require an undesirable amount of memory to process high-resolution images in certain applications.

SUMMARY

This disclosure relates to tone mapping in high-resolution imaging systems.

In a first embodiment, a method includes obtaining multiple image frames captured using at least one imaging sensor. The method also includes generating a local tone map, a global tone map look-up table (LUT), and one or more contrast enhancement LUTs based on at least one of the image frames and one or more parameters of the at least one imaging sensor. The method further includes generating a blended and demosaiced image based on the image frames and generating a local tone mapped image based on the blended and demosaiced image and the local tone map. The method also includes adjusting color saturation based on the local tone mapped image to generate a corrected image. In addition, the method includes generating an output image based on the corrected image, the global tone map LUT, and the one or more contrast enhancement LUTs.

In a second embodiment, an electronic device includes at least one imaging sensor configured to capture multiple image frames. The electronic device also includes at least one processing device configured to generate a local tone map, a global tone map LUT, and one or more contrast enhancement LUTs based on at least one of the image frames and one or more parameters of the at least one imaging sensor. The at least one processing device is also configured to generate a blended and demosaiced image based on the image frames and generate a local tone mapped image based on the blended and demosaiced image and the local tone map. The at least one processing device is further configured to adjust color saturation based on the local tone mapped image to generate a corrected image. In addition, the at least one processing device is configured to generate an output image based on the corrected image, the global tone map LUT, and the one or more contrast enhancement LUTs.

In a third embodiment, a non-transitory machine readable medium contains instructions that when executed cause at least one processor of an electronic device to obtain multiple image frames captured using at least one imaging sensor. The non-transitory machine readable medium also contains instructions that when executed cause the at least one processor to generate a local tone map, a global tone map LUT, and one or more contrast enhancement LUTs based on at least one of the image frames and one or more parameters of the at least one imaging sensor. The non-transitory machine readable medium further contains instructions that when executed cause the at least one processor to generate a blended and demosaiced image based on the image frames and generate a local tone mapped image based on the blended and demosaiced image and the local tone map. The non-transitory machine readable medium also contains instructions that when executed cause the at least one processor to adjust color saturation based on the local tone mapped image to generate a corrected image. In addition, the non-transitory machine readable medium contains instructions that when executed cause the at least one processor to generate an output image based on the corrected image, the global tone map LUT, and the one or more contrast enhancement LUTs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B." "at least one of A and/or B," or "one or more of A and/or B" may include all possible combinations of A and B. For example, "A or B," "at least one of A and B." and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
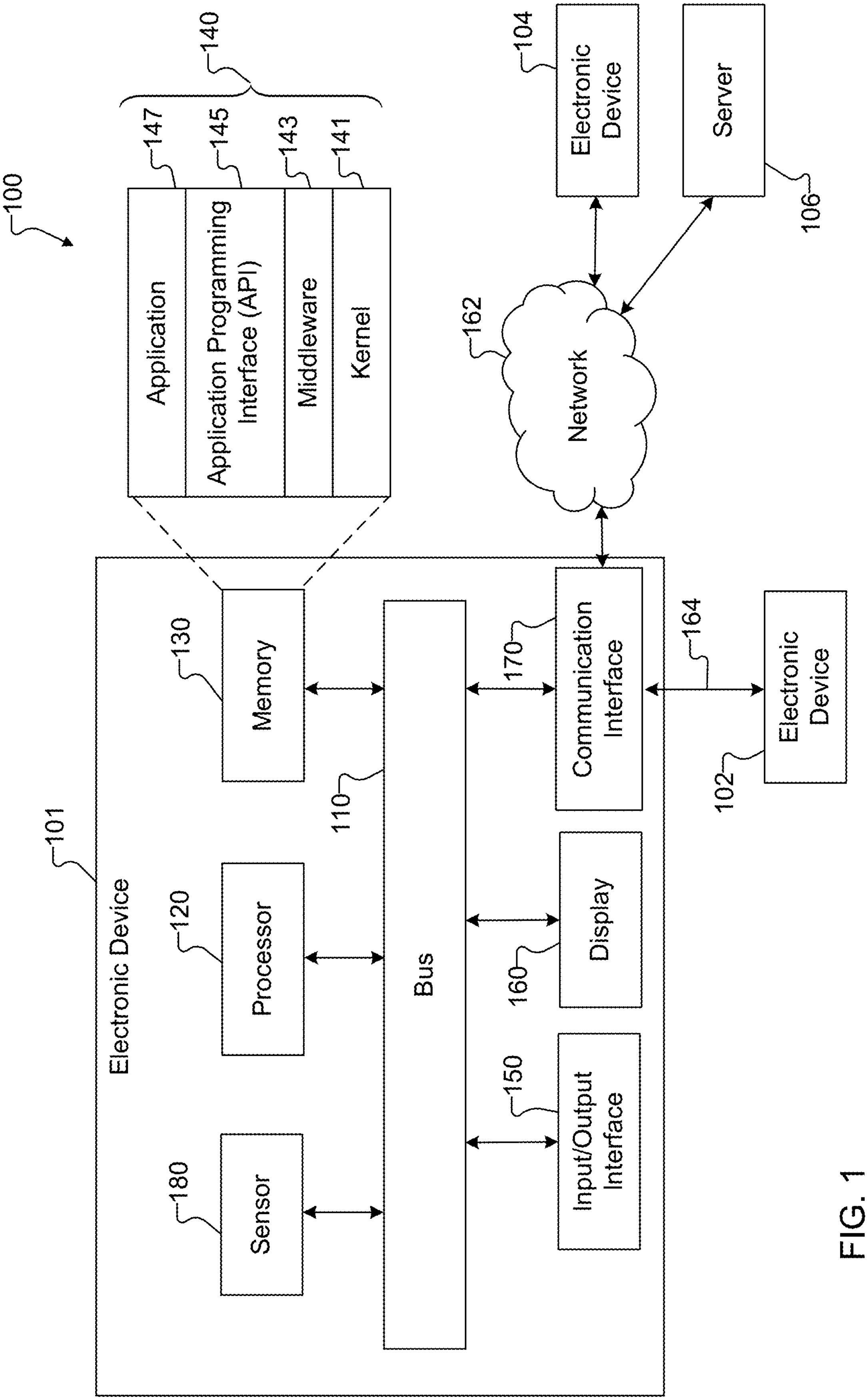
FIG. 1 illustrates an example network configuration including an electronic device in accordance with this disclosure.

FIGS. 1 through 17, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. While convenient, cameras on mobile electronic devices typically suffer from a number of shortcomings. For instance, the resolution of cameras included in various mobile electronic devices has increased significantly in recent years. While this may be desirable as it can increase the quality of images captured using the cameras, the use of higher resolutions also comes with various drawbacks. As one particular example, while it is possible to repurpose existing image signal processing (ISP) pipelines for use with high-resolution cameras, it may take an undesirable amount of time and require an undesirable amount of memory to process high-resolution images in certain applications.

Many ISP pipelines and other image processing pipelines include a tone mapping operation. During tone mapping, a determination is made whether to remap the color of each pixel in an image to a different color in order to generate a more-pleasing visual image. Tone mapping can be useful or important in various applications, such as when generating high dynamic range (HDR) images. For example, generating an HDR image often involves capturing multiple images of a scene using different exposures and combining the captured images to produce the HDR image, and this type of processing can often result in the creation of unnatural tone within the HDR image. Tone mapping can therefore be used to adjust the colors contained in the HDR images. In some cases, this can be done so that the tone mapped images can be displayed or otherwise presented in a form having a smaller dynamic range, such as when an HDR image is to be presented on a display device having a smaller dynamic range than the HDR image itself.

Tone mapping is typically applied towards the end of an ISP pipeline after various operations like image registration, warping, blending, and demosaicing have been performed. The most common way to apply tone mapping involves analyzing an image that has gone through the different operations in the ISP pipeline and determining whether local or global tone mapping should be applied. However, when used with high resolution cameras, the earlier operations in ISP pipelines may take prolonged periods of time due to the larger amounts of image data being processed. Starting the tone mapping process after an entire high-resolution image becomes available can lead to significant increases in overall processing times, which may not be acceptable in various applications. These tone mapping processes may also require large amounts of memory in order to process high-resolution images.

This disclosure provides techniques for tone mapping in high-resolution imaging systems. As described in more detail below, multiple image frames can be captured using at least one imaging sensor. In some cases, for example, the image frames may be captured by at least one imaging sensor or may represent image frames obtained by an electronic device. A local tone map, a global tone map look-up table (LUT), and one or more contrast enhancement LUTs can be generated based on at least one of the image frames and one or more parameters of the at least one imaging sensor. A blended and demosaiced image can be generated based on the image frames, such as by using a multi-frame image processing pipeline or other pipeline. In some cases, the local tone map, the global tone map LUT, and the one or more contrast enhancement LUTs can be generated at least partially in parallel with the generation of the blended and demosaiced image. A local tone mapped image can be generated based on the blended and demosaiced image and the local tone map. Color saturation can be adjusted (and optionally gamma correction can be performed) based on the local tone mapped image to generate a corrected image. An output image can be generated based on the corrected image, the global tone map LUT, and the one or more contrast enhancement LUTs.

In this way, it is possible to reduce the amount of time and memory needed to perform tone mapping, even when the images undergoing tone mapping have higher resolutions.

Moreover, in some embodiments, 3D LUT-based tone mapping can be performed, such as when a 3D look-up table can be generated using a two-dimensional (2D) tone map, and the 3D look-up table may be compliant with the ADOBE digital negative (DNG) specification or other suitable specification. Further, even though a gain map generated during image processing in this manner may have a lower resolution compared to the image frames being processed, morphological opening and guided filtering may be used to reduce or minimize artifacts in final images of scenes. In addition, color saturation of the final images of the scenes can be improved using the described approaches.

Note that while some of the embodiments discussed below are described in the context of use in consumer electronic devices (such as smartphones), this is merely one example. As a particular example, some of the embodiments discussed below may be used in smartphones that include imaging sensors capable of capturing image frames of up to fifty megapixels or more. However, it will be understood that the principles of this disclosure may be implemented in any number of other suitable contexts and may use any suitable devices, such as tablet computers, digital cameras, and other devices.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to obtain and process image frames in order to generate final images of scenes, where part of the image processing can include tone mapping associated with high-resolution images.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for obtaining and processing image frames, where part of the image processing can include tone mapping associated with high-resolution images. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to obtain and process image frames in order to generate final images of scenes, where part of the image processing can include tone mapping associated with high-resolution images.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
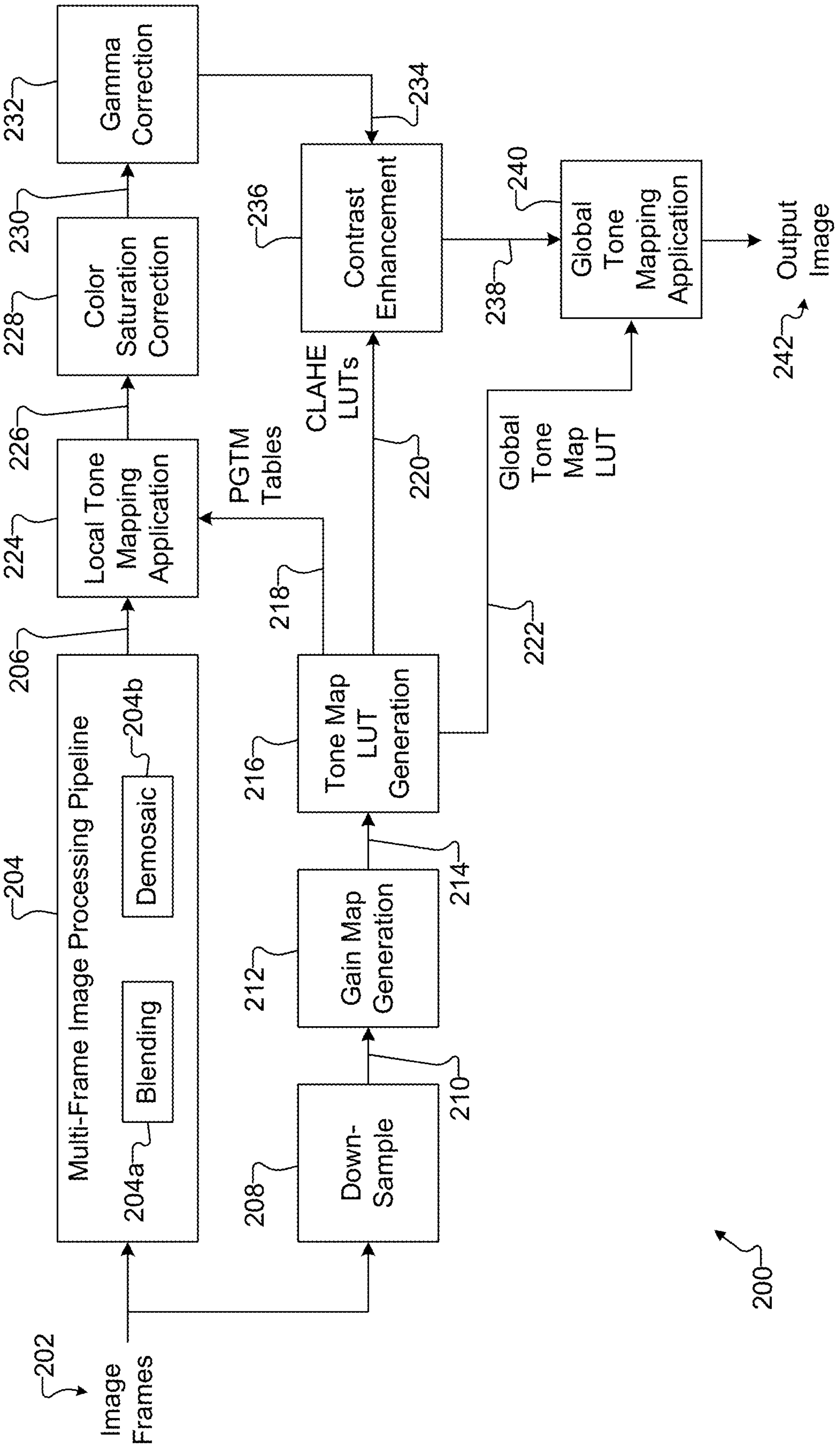
FIG. 2 illustrates an example architecture for tone mapping in a high-resolution imaging system in accordance with this disclosure.

FIG. 2 illustrates an example architecture 200 for tone mapping in a high-resolution imaging system in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 generally receives and processes multiple input image frames 202. The input image frames 202 may be obtained from any suitable source(s), such as when the input image frames 202 are produced by at least one camera or other imaging sensor 180 of the electronic device 101 during an image capture operation. In some embodiments, the input image frames 202 may represent raw image frames. Raw image frames typically refer to image frames that have undergone little if any processing after being captured. The availability of raw image frames can be useful in a number of circumstances since the raw image frames can be subsequently processed to achieve the creation of desired effects in output images. In many cases, for example, the input image frames 202 can have a wider dynamic range or a wider color gamut that is narrowed during image processing operations in order to produce still or video images suitable for display or other use. Each image frame 202 can have any suitable format, such as a Bayer or other raw image format, a red-green-blue (RGB) image format, or a luma-chroma (YUV) image format. Each image frame 202 can also have any suitable resolution, such as up to fifty megapixels or more.

In some embodiments, the input image frames 202 may include two or more image frames captured using different capture conditions. The capture conditions can represent any suitable settings of the electronic device 101 or other device used to capture the input image frames 202 or any suitable contents of scenes being imaged. For example, the capture conditions may represent different exposure settings of the imaging sensor(s) 180 used to capture the input image frames 202, such as different exposure times or ISO settings. In multi-frame processing pipelines, for instance, multiple input image frames 202 can be captured using different exposure settings so that portions of different input image frames 202 can be combined to produce an HDR output image or other blended image. The multiple input image frames 202 can also have different image contents when capturing dynamic scenes, such as when different portions of the input image frames 202 have different luminance (BV). In other embodiments, the input image frames 202 may include two or more image frames captured using common capture conditions.

The input image frames 202 are processed using a multi-frame image processing pipeline 204. The image processing pipeline 204 can perform various operations involving the input image frames 202 in order to generate blended or other processed images. For example, the image processing pipeline 204 here includes a blending operation 204*a* and a demosaic operation 204*b*. The blending operation 204*a* generally operates to combine image data contained in the input image frames 202. For instance, the blending operation 204*a* may process the input image frames 202 in order to identify a reference frame and modify portions of the reference frame using image data from one or more other (non-reference) frames. As a particular example, the blending operation 204*a* may take the reference frame and replace one or more portions of the reference frame containing motion with one or more corresponding portions of shorter-exposure image frames. In some cases, the blending operation 204*a* may perform a weighted blending operation to combine the pixel values contained in the image frames 202. Note, however, that this disclosure is not limited to any particular technique for combining image frames.

The demosaic operation 204*b* generally operates to convert image data produced using a Bayer filter array or other color filter array into reconstructed red-green-blue (RGB) data or other image data. For example, the demosaic operation 204*b* can perform various interpolations to fill in missing information, such as by estimating other colors' image data for each pixel. When using a Bayer filter array or some other types of color filter arrays, approximately twice as many pixels may capture image data using green filters compared to pixels that capture image data using red or blue filters. This can introduce non-uniformities into the captured image data, such as when the red and blue image data each have a lower signal-to-noise ratio (SNR) and a lower sampling rate compared to the green image data. Among other things, the green image data can capture high-frequency image content more effectively than the red and blue image data. The demosaic operation 204*b* can take information captured by at least one highly-sampled channel (such as the green channel and/or the white channel) and use that information to correct limitations of lower-sampled channels (such as the red and blue channels), which can help to reintroduce high-frequency image content into the red and blue image data Note, however, that this disclosure is not limited to any particular technique for demosaicing.

While not shown here, the image processing pipeline 204 can include a number of other or additional functions. For example, before blending the input image frames 202, the input image frames 202 may undergo bad pixel correction, which refers to a process for identifying image data from bad pixels of the imaging sensor(s) 180 and replacing the bad image data (such as via interpolation of neighboring good pixel data). The input image frames 202 may undergo lens shading correction to compensate for peripheral shading created by lenses used in or with imaging sensors 180. The input image frames 202 may undergo alignment so that common features in different input image frames 202 are at the same or substantially the same locations in the aligned image frames. If multiple input image frames 202 are captured using a common exposure, those input image frames 202 may be blended to produce a single image frame at that exposure (which can then be used during the blending operation 204*a*). After a blended and demosaiced image has been produced, the image may undergo various post-processing operations, such as noise filtering and image sharpening. In general, each of these operations (if included in the image processing pipeline 204) may be implemented in any suitable manner.

Note that the discussion of the image processing pipeline 204 above is for illustration and explanation only. Various ISP pipelines and other image processing pipelines have been developed, and additional ISP pipelines and other image processing pipelines are sure to be developed in the future. This disclosure is not limited to any specific implementation of the image processing pipeline 204. In general, the image processing pipeline 204 can produce a blended and demosaiced image 206 based on the input image frames 202. In some cases, the blended and demosaiced image 206 may include image data in multiple color channels, such as when the blended and demosaiced image 206 includes red, green, and blue color channels.

At least one of the input image frames 202 is also processed to support various tone mapping-related operations. As shown here, these processing operations may occur at least partially in parallel with the processing of the input image frames 202 by the image processing pipeline 204. As shown in FIG. 2, at least one of the input image frames 202 can be provided to a down-sampling operation 208, which generally operates to process the input image frame(s) 202 and generate one or more down-sampled image frames 210. Each down-sampled image frame 210 represents a lower-resolution version of the associated input image frame 202. As a particular example, an input image frame 202 may represent a fifty megapixel image frame, and the corresponding down-sampled image frame 210 may represent a three megapixel image frame. The down-sampling operation 208 may also convert the image data of the input image frame(s) 202 from one image domain to another image domain. For instance, the down-sampling operation 208 may convert Bayer or other raw image data in the input image frame(s) 202 into YUV image data in the down-sampled image frame(s) 210. The down-sampling operation 208 may use any suitable technique(s) to down-sample image frames and optionally to convert image data in the image frames. In some embodiments, the down-sampling operation 208 may receive and process a single one of the input image frames 202.

The one or more down-sampled image frames 210 are provided to a gain map generation operation 212, which generally operates to produce at least one gain map 214 associated with the one or more down-sampled image frames 210. Each gain map 214 identifies gains to be applied to pixel values of an image frame during one or more subsequent operations, such as one or more tone mapping operations. For example, a gain map 214 may include a gain value for each pixel of an image frame, and the gain value can be multiplied by the pixel value of the image frame in order to adjust the pixel value of the image frame. The gain map generation operation 212 may use any suitable technique(s) to generate gain maps 214, and one example implementation of the gain map generation operation 212 is described below. In some embodiments, the gain map generation operation 212 may receive and process a single down-sampled image frame 210 in order to generate a single gain map 214. Note that the blended and demosaiced image 206 may include image data in multiple color channels, and the same gain map 214 may be applied to each of the color channels as described below.

The one or more gain maps 214 are provided to a tone map LUT generation operation 216, which generally operates to process the gain map(s) 214 and generate various outputs used during subsequent tone mapping operations. For example, the tone map LUT generation operation 216 can generate a local tone map 218 associated with the input image frames 202. In this example, the local tone map 218 takes the form of various profile gain table map (PGTM) tables. The tone map LUT generation operation 216 can also generate one or more contrast enhancement LUTs 220 associated with the input image frames 202. In this example, the one or more contrast enhancement LUTs 220 take the form of contrast-limited adaptive histogram equalization (CLAHE) LUTs. In addition, the tone map LUT generation operation 216 can generate at least one global tone map LUT 222. Note that the specific forms of the outputs from the tone map LUT generation operation 216 here are for illustration only and can vary depending on the implementation. The tone map LUT generation operation 216 may use any suitable techniques to generate local tone maps, contrast enhancement LUTs, and global tone map LUTs, and example implementations of various functions of the tone map LUT generation operation 216 are described below.

The blended and demosaiced image 206 generated by the image processing pipeline 204 is subjected to various operations (including tone mapping operations) based on the outputs of the tone map LUT generation operation 216. For example, the blended and demosaiced image 206 can be provided to a local tone mapping application operation 224, which generally operates to apply local tone mapping to the blended and demosaiced image 206 in order to generate a locally-tone mapped image 226. Local tone mapping typically involves applying different tone mappings to different areas of an image. As such, the local tone mapping is often referred to as a spatially-varying tone mapping operation. Here, the local tone mapping application operation 224 can apply the PGTM tables or other local tone map 218 to the image data of the blended and demosaiced image 206 in order to generate the locally-tone mapped image 226. As described below, the local tone mapping application operation 224 can also perform additional functions (such as morphological opening and guided filtering) in order to reduce artifacts or otherwise improve the image quality of the locally-tone mapped image 226. The local tone mapping application operation 224 may use any suitable technique(s) to perform local tone mapping, and one example implementation of the local tone mapping application operation 224 is described below. Note that the local tone mapping application operation 224 may or may not reduce the bit depth of the image data being processed, meaning the image data in the locally-tone mapped image 226 may or may not have fewer bits than the image data in the blended and demosaiced image 206.

The locally-tone mapped image 226 is provided to a color saturation correction operation 228, which generally operates to modify the color saturation of the locally-tone mapped image 226 (if needed) in order to generate a corrected locally-tone mapped image 230. Various instances of the blended and demosaiced image 206 may include some color desaturation. In some cases, this may be due to the use of a single gain map for all color channels of a blended and demosaiced image 206 as described below. The color saturation correction operation 228 can be used to adjust the color saturation of the locally-tone mapped image 226 so that the color saturation is at the correct level in a final image of a scene being generated. The color saturation correction operation 228 may use any suitable technique(s) to adjust color saturation, and one example implementation of the color saturation correction operation 228 is described below.

The corrected locally-tone mapped image 230 may optionally be provided to a gamma correction operation 232, which generally operates to process the corrected locally-tone mapped image 230 in order to lower the dynamic range of the corrected locally-tone mapped image 230 and generate a lower-dynamic range image 234. For example, the gamma correction operation 232 may reduce the bit depth of the image data in the corrected locally-tone mapped image 230 so that the image data in the lower-dynamic range image 234 has fewer bits. The gamma correction operation 232 may use any suitable technique(s) for performing gamma correction and lowering the dynamic range of an image. In some embodiments, for instance, the gamma correction operation 232 may use a gamma correction look-up table (also known as a gamma curve) to perform the gamma correction. The gamma correction look-up table may include a mapping that can be used to convert values associated with the corrected locally-tone mapped image 230 into values associated with the lower-dynamic range image 234. In some cases, the gamma correction operation 232 or a subsequent operation (not shown in FIG. 2) may be used to convert the lower-dynamic range image 234 into a different image domain, such as when the lower-dynamic range image 234 is converted from the RGB image domain to the YUV image domain. Note that the gamma correction operation 232 here may be optional since a prior operation may have already reduced the dynamic range of image data, such as when the local tone mapping application operation 224 reduces the bit depth of the processed image data to a desired bit depth.

The lower-dynamic range image 234 is provided to a contrast enhancement operation 236, which generally operates to adjust the contrast within the lower-dynamic range image 234. For example, the contrast enhancement operation 236 can apply the one or more contrast enhancement LUTs 220 to the image data of the lower-dynamic range image 234 in order to adjust the contrast within the lower-dynamic range image 234. This results in the generation of a contrast-enhanced image 238. The contrast enhancement operation 236 may use any suitable technique(s) for performing contrast enhancement, such as by using a CLAHE or other form of adaptive histogram equalization or other contrast enhancement technique.

The contrast-enhanced image 238 is provided to a global tone mapping application operation 240, which generally operates to apply global tone mapping to the contrast-enhanced image 238 in order to generate an output image 242. Global tone mapping typically involves applying a common tone mapping to an entire image. As such, the global tone mapping is often referred to as a spatially-uniform tone mapping operation. Here, the global tone mapping application operation 240 can apply the global tone map LUT 222 to the image data of the contrast-enhanced image 238 in order to generate the output image 242. The global tone mapping application operation 240 may use any suitable technique(s) to perform global tone mapping.

Note that in the architecture 200 of FIG. 2, the various images frames and images may have any suitable bit depths. For example, the input image frames 202 may contain image data having twelve bits, and the input image frames 202 may be combined to generate blended and demosaiced images 206 that contain image data having sixteen bits. The blended and demosaiced images 206 may be processed to generate output images 242 that contain image data having eight bits. Of course, image data having any other suitable bit depths may be used in the architecture 200.

Although FIG. 2 illustrates one example of an architecture 200 for tone mapping in a high-resolution imaging system, various changes may be made to FIG. 2. For example, various components and functions in FIG. 2 may be combined, further subdivided, replicated, rearranged, or omitted according to particular needs. Also, various additional components and functions may be used in FIG. 2, such as when one or more pre-processing operations may be performed on the input image frames 202 and/or when one or more post-processing operations may be performed on the output image 242.

Figure 3:
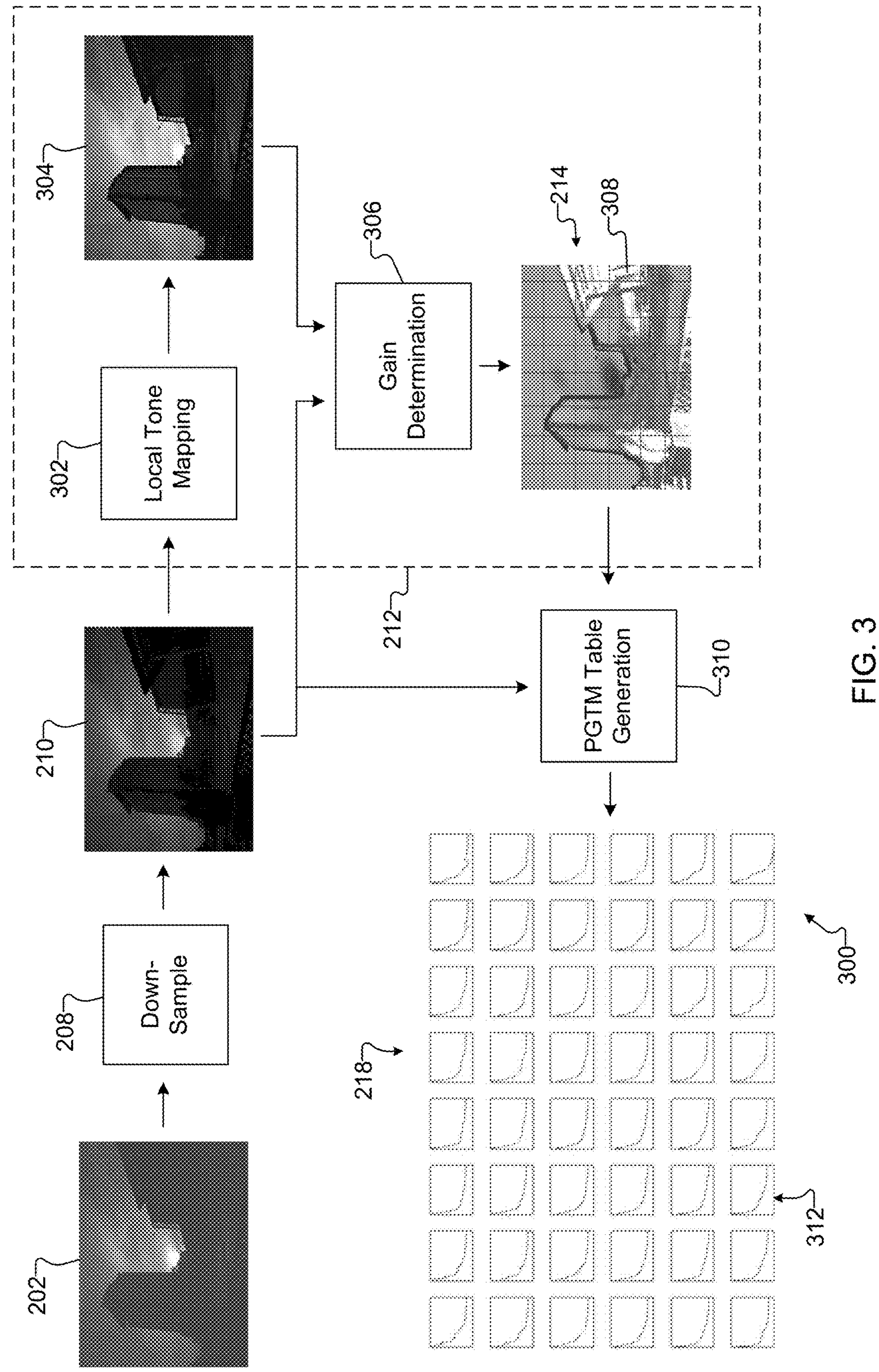
FIG. 3 illustrates an example process for generating local tone maps in the architecture of FIG. 2 in accordance with this disclosure.

FIG. 3 illustrates an example process 300 for generating local tone maps 218 in the architecture 200 of FIG. 2 in accordance with this disclosure. For ease of explanation, the process 300 shown in FIG. 3 is described as being implemented on or supported by the electronic device 101 in the network configuration 100 of FIG. 1 using the architecture 200 of FIG. 2. The process 300 may, for example, be performed as at least part of the gain map generation operation 212 and the tone map LUT generation operation 216. However, the process 300 shown in FIG. 3 could be used with any other suitable device(s) having any other suitable architecture(s) and in any other suitable system(s), such as when the process 300 is implemented on or supported by the server 106.

As shown in FIG. 3, an input image frame 202 is processed using the down-sampling operation 208 in order to generate a down-sampled image frame 210. As described above, in some embodiments, the down-sampling operation 208 may receive and process a single one of the input image frames 202 that are processed by the image processing pipeline 204. For example, if an HDR image is being generated, the input image frame 202 that is down-sampled may represent an image frame captured using a shorter exposure (relative to one or more other input image frames 202). If an HDR image is not being generated, the input image frame 202 that is down-sampled may represent any of the input image frames 202. In this example, the down-sampling operation 208 can down-convert the input image frame 202 and convert the down-converted image frame into the luma image domain. As a result, the down-sampled image frame 210 can be said to represent a single luma channel image.

As part of the gain map generation operation 212, a local tone mapping function 302 can be applied to the down-sampled image frame 210 in order to generate a tone mapped image 304. The local tone mapping function 302 here can apply any suitable local or spatially-varying tone mapping to the down-sampled image frame 210 in order to generate the tone mapped image 304. In some embodiments, for instance, the local tone mapping function 302 may use one or more multi-exposure fusion techniques disclosed in U.S. Pat. No. 11,430,094 (which is hereby incorporated by reference in its entirety) to provide local tone mapping. Note, however, that this disclosure is not limited to any specific technique(s) for performing local tone mapping.

A gain determination function 306 uses the down-sampled image frame 210 and the tone mapped image 304 to generate a gain map 214. The gain map 214 identifies the gain values that would need to be applied to the pixel values of the down-sampled image frame 210 in order to produce the tone mapped image 304. For example, the gain determination function 306 can divide the value for each pixel in the tone mapped image 304 by the corresponding value for the pixel in the same location in the down-sampled image frame 210. The resulting value is treated as the gain value for that pixel in the gain map 214, and this can be done for each pixel location in the down-sampled image frame 210 and the tone mapped image 304.

The gain map 214 is divided into tiles 308, and the tiles 308 of the gain map 214 are processed by a PGTM table generation function 310, which may form part of the tone map LUT generation operation 216. The PGTM table generation function 310 generally operates to process the gain values contained in the tiles 308 of the gain map 214 and generate a 3D look-up table that forms the local tone map 218 based on the tiles 308. The 3D look-up table represents a collection of intensity-gain curves 312 (which may also be referred to as PGTM tables). Each tile 308 can be used to generate gain values in one of the intensity-gain curves 312. As described below, the 3D look-up table includes multiple intensity-gain curves 312 associated with different spatial locations within an image. The number of intensity-gain curves 312 in the 3D look-up table can be based on the number of tiles 308. For example, if the gain map 214 is divided into M &N tiles 308, the PGTM table generation function 310 can produce M×N intensity-gain curves 312 in the 3D look-up table. Each intensity-gain curve 312 can be used to define gain as a function of input luma (intensity), which means that the gain applied to each pixel of an image is based on the intensity of that pixel.

Figure 4:
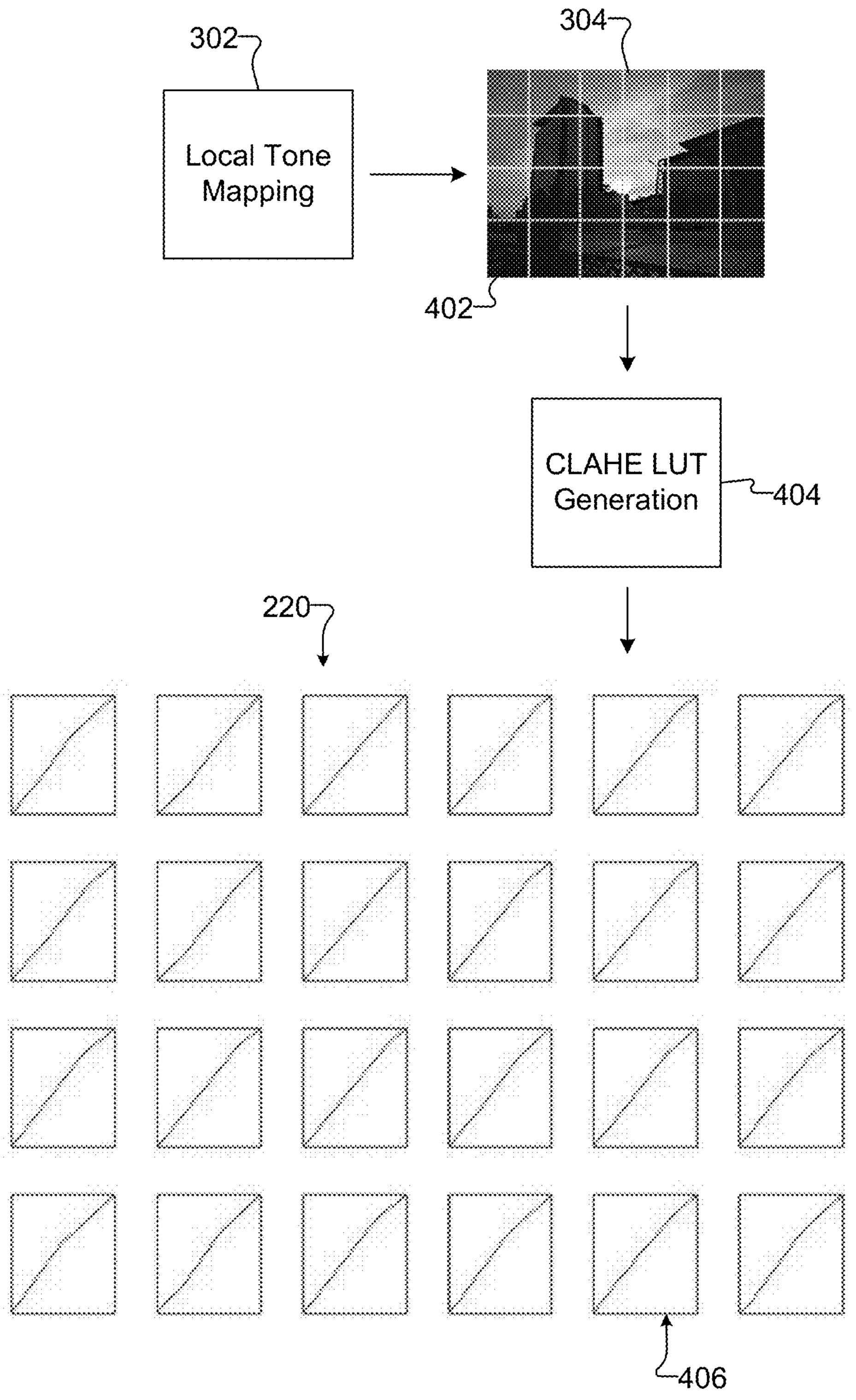
FIG. 4 illustrates an example process for generating contrast enhancement look-up tables (LUTs) in the architecture of FIG. 2 in accordance with this disclosure.

FIG. 4 illustrates an example process 400 for generating contrast enhancement LUTs 220 in the architecture 200 of FIG. 2 in accordance with this disclosure. For ease of explanation, the process 400 shown in FIG. 4 is described as being implemented on or supported by the electronic device 101 in the network configuration 100 of FIG. 1 using the architecture 200 of FIG. 2. The process 400 may, for example, be performed as part of the tone map LUT generation operation 216. However, the process 400 shown in FIG. 4 could be used with any other suitable device(s) having any other suitable architecture(s) and in any other suitable system(s), such as when the process 400 is implemented on or supported by the server 106.

As shown in FIG. 4, the local tone mapping function 302 is used to generate the tone mapped image 304, which is described above with respect to FIG. 3. The tone mapped image 304 is divided into tiles 402, which may or may not have the same size(s) and arrangement as the tiles 308. Each of the tiles 402 in this example is processed using a CLAHE LUT generation function 404, which generally processes the image data in the tiles 402 in order to generate CLAHE LUTs 406. The CLAHE LUTs 406 may represent the contrast enhancement LUTs 220. Each CLAHE LUT 406 can define a transform function or curve that maps how pixel values in a lower-dynamic range image 234 can be modified into pixel values in an associated contrast-enhanced image 238. Note that while CLAHE is used here to generate the contrast enhancement LUTs 220, any other suitable contrast enhancement technique may be used.

Figure 5:
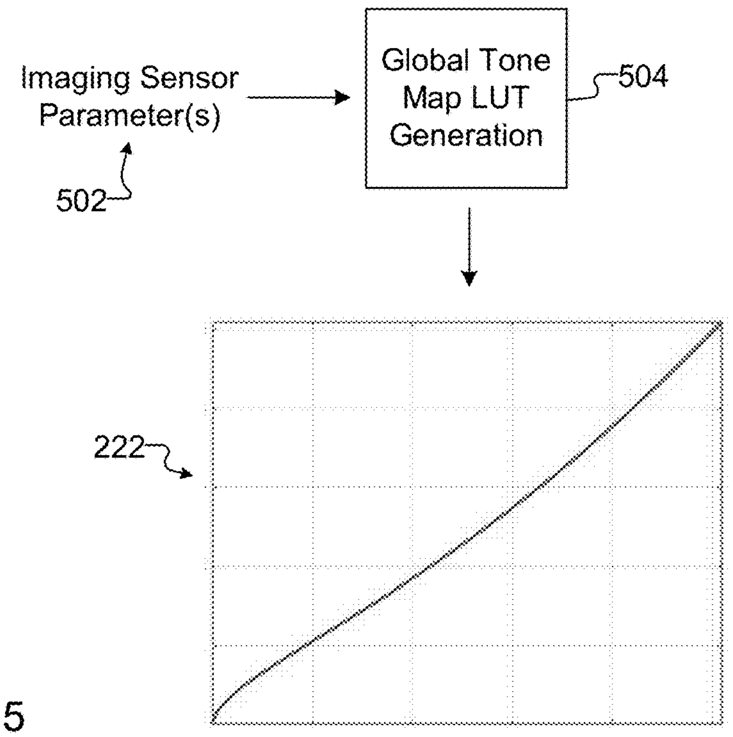
FIG. 5 illustrates an example process for generating a global tone map LUT in the architecture of FIG. 2 in accordance with this disclosure.

FIG. 5 illustrates an example process 500 for generating a global tone map LUT 222 in the architecture 200 of FIG. 2 in accordance with this disclosure. For ease of explanation, the process 500 shown in FIG. 5 is described as being implemented on or supported by the electronic device 101 in the network configuration 100 of FIG. 1 using the architecture 200 of FIG. 2. The process 500 may, for example, be performed as part of the tone map LUT generation operation 216. However, the process 500 shown in FIG. 5 could be used with any other suitable device(s) having any other suitable architecture(s) and in any other suitable system(s), such as when the process 500 is implemented on or supported by the server 106.

As shown in FIG. 5, one or more parameters 502 associated with the imaging sensor(s) 180 used to capture the input image frames 202 are provided to a global tone map LUT generation function 504. The one or more parameters 502 may include any suitable parameter or parameters of the imaging sensor(s) 180 that can affect whether and how global tone mapping is used. For example, the one or more parameters 502 may include at least one of an ISO used to capture one of the input image frames 202, overall luminance (BV) of the input image frame 202, and an exposure time used to capture the input image frame 202. The global tone map LUT generation function 504 generally operates to process the one or more parameters 502 and generate the global tone map LUT 222. The global tone map LUT 222 can define a transform function or curve that maps how pixel values in a contrast-enhanced image 238 can be modified into pixel values in an associated output image 242. The global tone map LUT generation function 504 may use any suitable technique(s) to generate the global tone map LUT 222. In some embodiments, for instance, the global tone map LUT generation function 504 may use one or more techniques disclosed in U.S. Patent Publication No. 2023/0052082 (which is hereby incorporated by reference in its entirety) to generate a global tone map LUT 222.

Using these approaches, the architecture 200 may be used to generate a local tone map 218, one or more contrast enhancement LUTs 220, and a global tone map LUT 222 used for tone mapping of a blended and demosaiced image 206. The local tone map 218, contrast enhancement LUT(s) 220, and global tone map LUT 222 can be generated using the input image frames 202, rather than waiting for the blended and demosaiced image 206 to be generated, which can speed up the process of generating the output image 242. Here, the architecture 200 can generate a gain map 214 based on an input image frame 202 and the results from the local tone mapping function 302. The gain map 214 can be encoded, such as in the form of PGTM tables or intensity-gain curves 312, to produce the local tone map 218 while also reducing or minimizing artifacts that may appear from generating and applying local tone mapping based on a lower-resolution version of one of the input image frames 202. The contrast enhancement LUT(s) 220 and the global tone map LUT 222 can be generated and may have relatively small sizes, which can help to reduce memory requirements. The contrast enhancement LUT(s) 220 and the global tone map LUT 222 can be respectively applied by the contrast enhancement operation 236 and the global tone mapping application operation 240 during generation of the output image 242.

Although FIGS. 3 through 5 illustrate examples of processes 300, 400, 500 for generating local tone maps 218, contrast enhancement LUTs 220, and global tone map LUTs 222 in the architecture 200 of FIG. 2, various changes may be made to FIGS. 3 through 5. For example, various components and functions in each of FIGS. 3 through 5 may be combined, further subdivided, replicated, rearranged, or omitted according to particular needs. Also, various additional components and functions may be used in each of FIGS. 3 through 5. In addition, while FIGS. 3 through 5 illustrate specific examples of how local tone maps 218, contrast enhancement LUTs 220, and global tone map LUTs 222 may be generated in the architecture 200 of FIG. 2, each of the local tone maps 218, contrast enhancement LUTs 220, and global tone map LUTs 222 may be generated in any other suitable manner.

FIGS. 6 through 14 illustrate an example process 700 for generating a 3D look-up table 600 in the architecture 200 of FIG. 2 in accordance with this disclosure. For ease of explanation, the 3D look-up table 600 and the process 700 shown in FIGS. 6 through 14 are described as being implemented on or supported by the electronic device 101 in the network configuration 100 of FIG. 1 using the architecture 200 of FIG. 2. The process 700 may, for example, be performed as at least part of the PGTM table generation function 310 to generate a 3D look-up table 600 that forms the local tone map 218. However, the 3D look-up table 600 and the process 700 shown in FIGS. 6 through 14 could be used with any other suitable device(s) having any other suitable architecture(s) and in any other suitable system(s), such as when the 3D look-up table 600 and the process 700 are implemented on or supported by the server 106.

Figure 6:
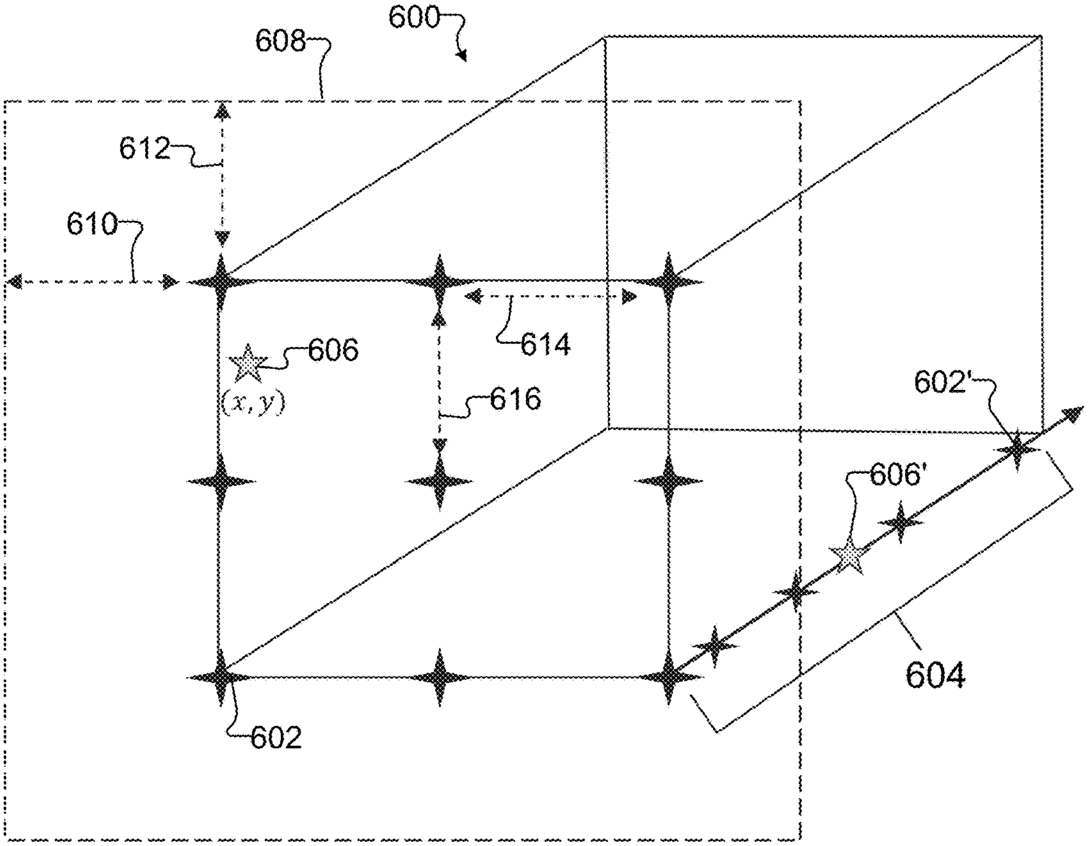
FIGS. 6 through 13 illustrate an example process for generating a three-dimensional (3D) LUT in the architecture of FIG. 2 in accordance with this disclosure.

As shown in FIG. 6, a 3D look-up table 600 may be defined for use during local tone mapping. As can be seen in FIG. 6, the 3D look-up table 600 can include a gain value for each of multiple anchor points 602. Each anchor point 602 may, for example, represent a center pixel location or other pixel location in each tile 308. Moreover, the 3D look-up table 600 can include multiple gain values for each anchor point 602 along an intensity dimension 604, meaning there can be anchor points or bins 602' in the intensity dimension 604. This means that (i) the 3D look-up table 600 includes multiple gain values for each anchor point 602 and (ii) these gain values are associated with different intensity values. In some cases, for instance, the 3D look-up table 600 includes 256 gain values for each anchor point 602 (one gain value for each of 256 different intensity anchor points or bins 602'). Note, however, that the number of gain values for each anchor point 602 along the intensity dimension 604 can vary depending on the implementation. In some embodiments, if the gain map 214 is divided into M×N tiles 308, the 3D look-up table 600 may have a size of M×N×I (where I represents the number of gain values at each anchor point 602 along the intensity dimension 604).

When local tone mapping is performed using the 3D look-up table 600, arbitrary coordinates 606 within the image data may be identified. The arbitrary coordinates 606 are also associated with an intensity location 606', which is defined by the intensity of the image data at the coordinates 606. When the arbitrary coordinates 606 lie on a single anchor point 602 and the intensity location 606' lies on a single intensity anchor point or bin 602', the gain value associated with that anchor point 602 for that intensity can be applied to a pixel of the image data being processed. When the arbitrary coordinates 606 do not lie on an anchor point 602 but the intensity location 606' lies on a single intensity anchor point or bin 602', the gain value to be applied to a pixel of the image data at the arbitrary coordinates 606 can be determined using the gain values at the four surrounding anchor points 602 as identified in that particular intensity anchor point or bin 602'. When the arbitrary coordinates 606 do not lie on an anchor point 602 and the intensity location 606' does not lie on a single intensity anchor point or bin 602', the gain value to be applied to a pixel of the image data at the arbitrary coordinates 606 can be determined using the gain values at the four surrounding anchor points 602 for each of those two intensity anchor points or bins 602'. In some embodiments, for instance, interpolation may be used to combine the gain values at the surrounding anchor points 602 (in the same or different anchor points or bins 602') and produce an interpolated gain value to be applied to the pixel at the arbitrary coordinates 606. Any suitable type of interpolation may be performed here, such as bilinear interpolation, although other approaches for combining gain values may also be used. The interpolations or other combinations of gain values can be repeated for all arbitrary coordinates within the image data being processed as needed in order to determine appropriate gain values to be applied to the image data.

In the example above, it has been assumed that the image data being processed is contained in a single color channel. Thus, gains at arbitrary coordinates 606 within the image data can be determined as described above. However, in other cases, the image data being processed may represent multi-channel image data, such as when an image is defined using image data in red, green, and blue color channels (for RGB images) or image data in red, green, blue, and white color channels (for RGBW images). In those cases, it is possible for intensity values at the same pixel location to vary in the different color channels. In some embodiments, different gains from the 3D look-up table 600 could be applied to pixels in different color channels (even at the same pixel locations) based on the intensity values of those pixels in the different color channels. In other embodiments, the intensity values at a common pixel location in different color channels may be combined, and the combined intensity value may be used to access the 3D look-up table 600 and identify a single gain value that is applied to that pixel location. For instance, the intensity values at the same pixel location in different color channels may be combined in the following manner.

$$Z = [R(x, y), G(x, y), B(x, y), \min(R(x, y), G(x, y), B(x, y)), \max(R(x, y), G(x, y), B(x, y))]$$

$$L = (Z \cdot MapInputWeights)$$

Here, R(x, y), G(x, y), and B(x, y) respectively represent red, green, and blue values of a pixel at the arbitrary coordinates 606 denoted (x, y). Note that this listing of pixel values can change depending on which color channels are used in the image data being processed. Also, Z represents a vector formed by the pixel values and the minimum and maximum pixel values, and MapInputWeights represents a vector that weights the elements of Z. In addition, L represents the combined intensity value for the pixel values at the pixel location (x, y). Once the four anchor points 602 around the pixel location (x, y) are identified, the combined intensity value Z can be used as the intensity for that pixel, and the four gain values at the four anchor points 602 for the combined intensity value L can be obtained from the 3D look-up table 600 and used in the same manner described above.

In the example shown in FIG. 6, the anchor points 602 are defined within a coordinate map 608. In some cases, the coordinate map 608 may correspond to the dimensions of the image data being processed (although this is not required). Also, in some cases, the anchor points 602 can be defined within the coordinate map 608 using four values, namely a horizontal distance 610 and vertical distance 612 of an anchor point 602 from an origin, a horizontal spacing 614, and a vertical spacing 616. The horizontal distance 610 defines the horizontal location or distance of one anchor point 602 from an origin (which in this example represents the upper left corner of the coordinate map 608), and the vertical distance 612 defines the vertical location or distance of that anchor point 602 from the origin. Once this anchor point 602 is identified, all other anchor points 602 may be determined using the horizontal spacing 614 and the vertical spacing 616, such as by defining the other anchor points 602 as having the horizontal spacing 614, the vertical spacing 616, or both (until no additional anchor points 602 can be defined within the coordinate map 608).

Figure 7:
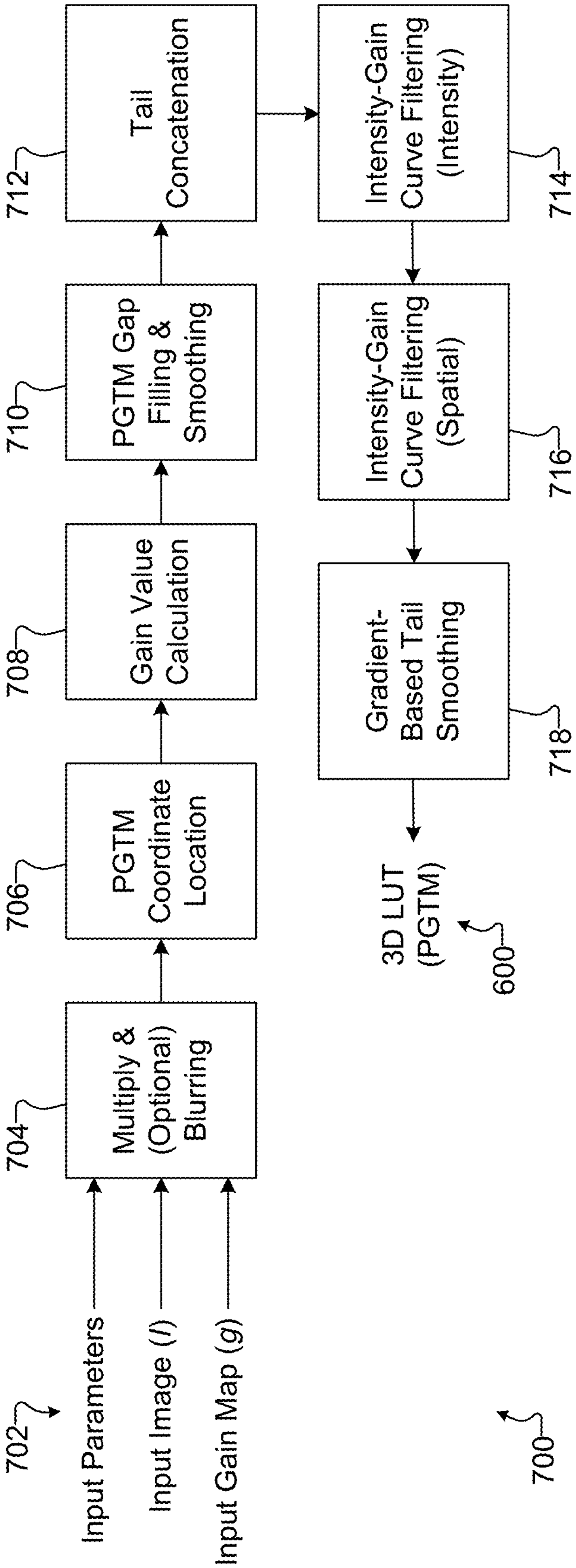

As shown in FIG. 7, an example process 700 is provided for generating a 3D look-up table 600. As noted above, the process 700 may be performed as at least part of the PGTM table generation function 310. As shown in FIG. 7, various inputs 702 are received by the PGTM table generation function 310. These inputs 702 can include an input image (denoted I), such as the down-sampled image frame 210. These inputs 702 can also include an input gain map (denoted g), such as the gain map 214. These inputs 702 can further include one or more input parameters, such as a definition of the size of the 3D look-up table 600 to be generated or the number and arrangement of anchor points 602 to be used (like a definition of the horizontal distance 610, vertical distance 612, horizontal spacing 614, and vertical spacing 616). A multiply and (optional) blurring function 704 can be used to multiply the image data of the input image I by the gain values contained in the input gain map g. This can be a pixel-wise operation in which each pixel of the input image I is multiplied by the gain value at the same location in the input gain map g. Effectively, this applies the gains as defined in the gain map 214 to the image data in the down-sampled image frame 210. Pre-blurring may optionally be applied here, such as by slightly blurring the multiplication results, to avoid boundary artifacts or other issues.

The resulting image data as generated by the function 704 is provided to a PGTM coordinate location function 706, which generally operates to use the intensity of each pixel in the image data from the function 704 to select one or more spatial locations and one or more intensity locations associated with that pixel in the 3D look-up table 600. In some embodiments, each pixel in the image data being processed may be associated with one, two, or four spatial locations and one or two intensity locations. The exact number of spatial and intensity locations associated with each pixel depends on the spatial position of that pixel in the image data and the intensity of that pixel. For example, if a pixel is located directly on an anchor point 602, that pixel can have a single spatial location as defined by that anchor point 602. If a pixel is located directly between two anchor points 602, that pixel can have two spatial locations as defined by those two anchor points 602. If a pixel is located somewhere between four anchor points 602, that pixel can have four spatial locations as defined by those four anchor points 602. Similarly, if the intensity of that pixel is located on a specific anchor point or bin 602', that pixel can have one intensity location as defined by that anchor point or bin 602'. If the intensity of that pixel is located between two anchor points or bins 602', that pixel can have two intensity locations as defined by those two anchor points or bins 602'.

Figure 8:
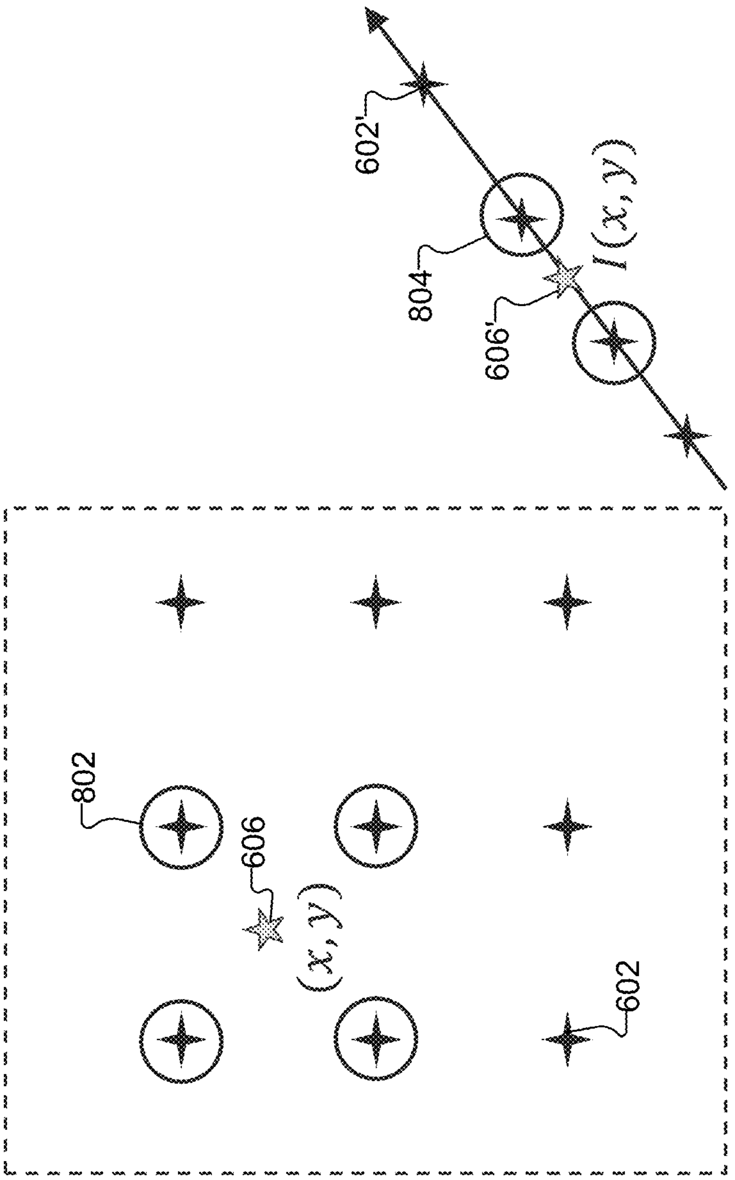

An example of this is shown in FIG. 8, where a pixel is located at the coordinates 606 defined by (x, y) values. Here, the pixel does not lie directly on any anchor points 602 and is not positioned directly between two anchor points 602, so the pixel is determined to be associated with four spatial locations as defined by circles 802. These circles 802 identify the four anchor points 602 that surround the coordinates 606 of the pixel. The pixel is also associated with an intensity that is defined by I(x, y) and identified at the intensity location 606'. Since the intensity location 606' does not lie directly on any anchor points or bins 602', the pixel is determined to be associated with two intensity locations defined by circles 804. These circles 804 identify the two anchor points or bins 602' that surround the intensity location 606' of the pixel. Effectively, the PGTM coordinate location function 706 here is determining which spatial and intensity locations in the 3D look-up table 600 are associated with each pixel of image data being processed. In this example, there are nine anchor points 602 each associated with four anchor points or bins 602', although this is for illustration only.

The spatial and intensity locations as determined by the function 706 are provided to a gain value calculation function 708, which generally operates to determine the gain values to be initially included in the 3D look-up table 600. For example, the gain value calculation function 708 may determine the gain value for a pixel at given spatial coordinates and a given intensity by summing the I×g values that correspond to the spatial location(s) associated with the pixel and dividing the result by the sum of the gain values g that correspond to the same spatial location(s). If a pixel is associated with a single anchor point 602 and a single anchor point or bin 602', the result is the gain at that anchor point 602 within that anchor point or bin 602'. If a pixel is associated with two or four anchor points 602 and a single anchor point or bin 602', the result is the sum of the I×g values at those two or four anchor points 602 within that anchor point or bin 602' divided by the total gains of those two or four anchor points 602. If a pixel is associated with two or four anchor points 602 and two anchor points or bins 602', the result is the sum of the I×g values at those two or four anchor points 602 within both of the anchor points or bins 602' divided by the total gains of those two or four anchor points 602 within both of the anchor points or bins 602'. Using the example shown in FIG. 8, the gain value for the pixel at coordinates 606 with the intensity location 606' can be based on a sum of the image pixel values multiplied by the gains at eight locations (four locations identified by the circles 802 in each of the two circled anchor points or bins 602') divided by the sum of those gains. Mathematically, the gain value used in a location j of the 3D look-up table 600 may be determined as follows.

$$\text{gain}^j = \min_g \left\{ \sum_i \left\| g I_i^j - g_i^j I_i^j \right\| \right\} = \frac{\sum_i g_i^j I_i^j}{\sum_i g_i^j}$$

A gap filling and smoothing function 710 can process the gain values initially included in the 3D look-up table 600 (as determined by the function 708) in order to fill in gaps or missing values and to smooth the values. These gaps may typically be caused by a lack of image data in the down-sampled image frame 210 being processed. For example, individual portions of an image routinely lack image data at every single possible intensity. As a result, it may be routine for the 3D look-up table 600 (as initially determined by the function 708) to lack gain values for certain spatial locations across various intensities. The filling and smoothing function 710 helps to compensate for this by adding missing gain values to the 3D look-up table 600 and smoothing the gain values in the 3D look-up table 600. The filling and smoothing function 710 may use any suitable technique(s) to fill in missing gain values and to smooth gain values. In some embodiments, for instance, the filling and smoothing function 710 may use a 3D kernel that only considers locations with actual values in the 3D look-up table 600 and uses those actual values to fill in gaps and to smooth the 3D look-up table 600.

Figure 9:
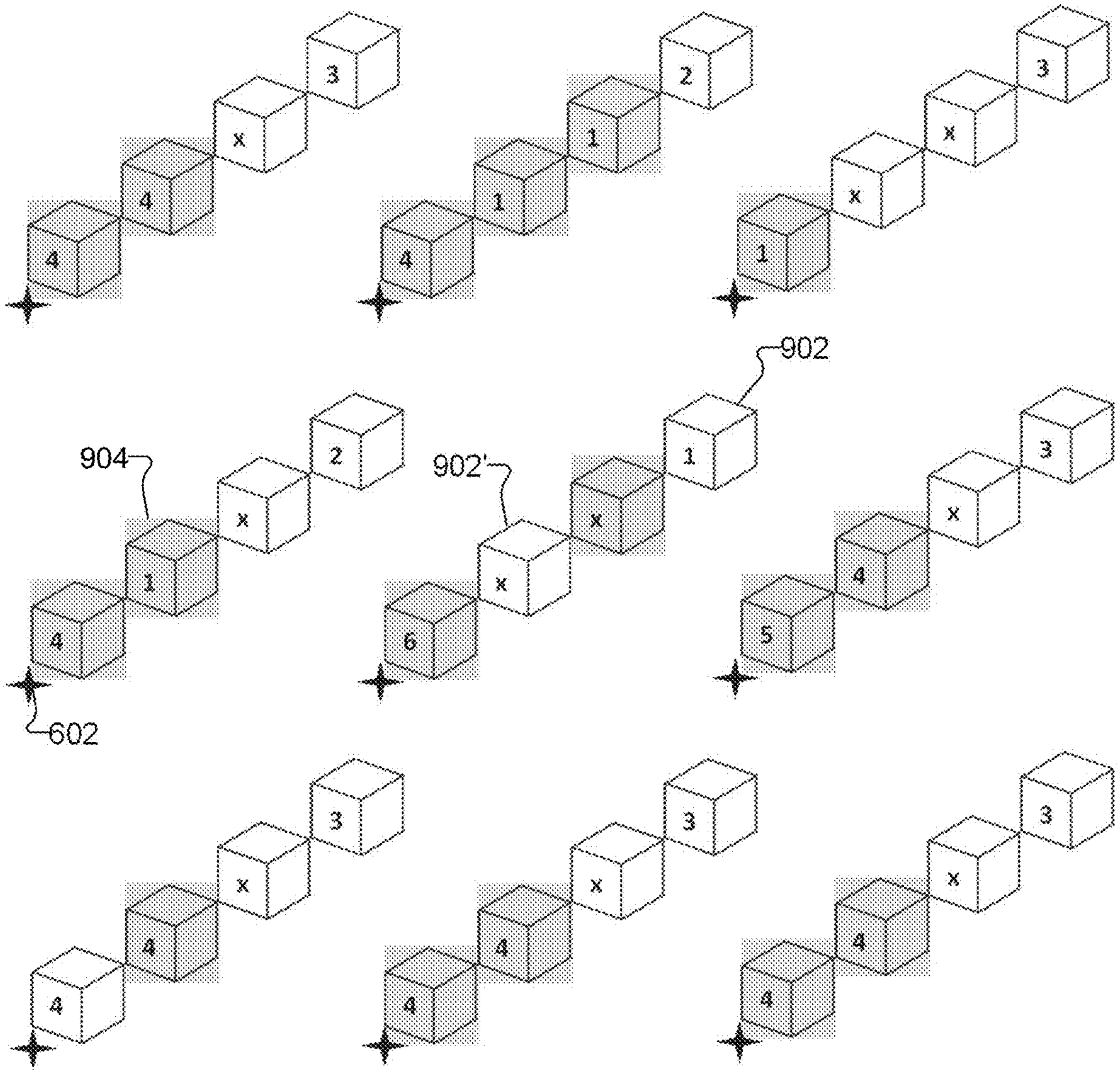

An example of this gap filling is shown in FIG. 9. As shown in FIG. 9, the 3D look-up table 600 is represented using boxes 902, where each anchor point 602 has multiple boxes 902 defining the gains to be applied to a pixel at the anchor point 602 across various intensities. Again, in this example, there are nine anchor points 602 each associated with four anchor points or bins 602', although this is for illustration only. Certain boxes 902 contain numerical values, which may represent actual gain values. Other boxes 902 contain an "x" value, and each instance of these boxes is indicative of a missing gain value at the associated spatial location and corresponding intensity. Boxes 902 with missing gain values can therefore be filled in using gain values from neighboring boxes. For example, consider the box 902' that has a missing value. The gap filling and smoothing function 710 can use the values in the boxes 902 identified by shading 904 to produce a value for the box 902'. As a particular example, the gap filling and smoothing function 710 can multiply a 3D kernel by the values in the shaded boxes, sum the products, and divide the sum by the weights of the 3D kernel that correspond to the shaded boxes in order to normalize the final result. The final result can be inserted into the box 902' as the gain value for that specific spatial location and intensity. Similar operations may occur for all other missing values in the 3D look-up table 600.

At this point, each of the anchor points 602 is associated with an intensity-gain curve that maps different gain values to different intensity values That is, the boxes 902 associated with a single anchor point 602 identify various gain values to be applied at that anchor point 602, where the specific gain value to be applied to image data at that anchor point 602 depends on the intensity of the image data.

The intensity-gain curves can be subjected to various post-processing operations in order to finalize the 3D look-up table 600. For example, a tail concatenation function 712 can determine whether any of the intensity-gain curves ends prematurely. That is, in some circumstances, an intensity-gain curve may be defined partially across the range of potential intensity values, such as when the down-sampled image frame 210 being processed lacks image data in certain tiles 308 across the full range of intensities. For any such intensity-gain curve, the tail concatenation function 712 can concatenate a parameterized tail to that intensity-gain curve. The tail concatenation function 712 may use any suitable technique(s) to identify intensity-gain curves that end prematurely and to concatenate parameterized tails to those intensity-gain curves. In some embodiments, for instance, the tail concatenation function 712 may identify knee points associated with an intensity-gain curve and define the parameterized tail using those knee points.

An intensity-gain curve filtering function 714 can filter the resulting intensity-gain curves in the intensity dimension, and an intensity-gain curve filtering function 716 can filter the resulting intensity-gain curves in the spatial dimension. For example, the intensity-gain curve filtering function 714 can filter the intensity-gain curve for each anchor point 602 using low-pass filtering or other filtering across the intensity dimension 604 in order to ensure smooth tone transitions for adjacent intensities. Similarly, the intensity-gain curve filtering function 716 can filter the intensity-gain curve for each anchor point 602 using low-pass filtering or other filtering across the spatial dimension in order to ensure smooth tone transitions for adjacent intensities.

A gradient-based tail smoothing function 718 can process the resulting intensity-gain curves in order to determine whether any of the intensity-gain curves has a parameterized tail with a gradient larger than a threshold. For example, an intensity-gain curve may have a larger-than-desired gradient if the tail of the intensity-gain curve is relatively short, which can cause undesirable artifacts. For any such intensity-gain curve, the gradient-based tail smoothing function 718 can smooth the parameterized tail of that intensity-gain curve. The gradient-based tail smoothing function 718 may use any suitable technique(s) to smooth a parameterized tail, such as by using a low-pass or other filtering operation.

Figure 10:
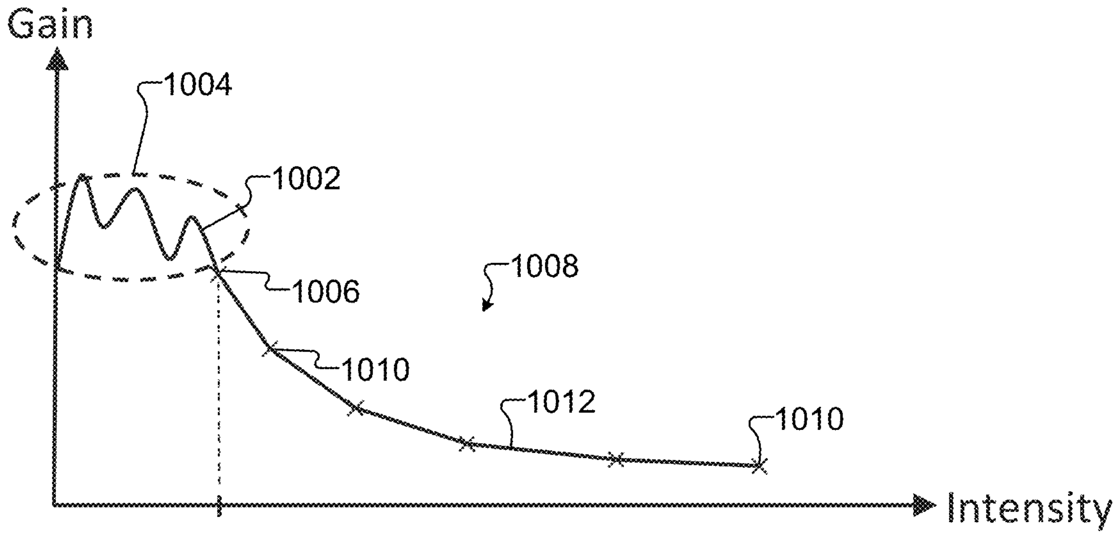

Examples of these operations are shown in FIGS. 10 through 13. As shown in FIG. 10, an intensity-gain curve 1002 may be defined as originally including only a portion 1004 of a curve. The tail concatenation function 712 can determine that the intensity-gain curve 1002 ends prematurely, such as when the intensity-gain curve 1002 ends at a point 1006 that is relatively far from the largest expected intensity value to be included in the intensity-gain curve 1002. When that condition is detected, the tail concatenation function 712 can concatenate a parameterized tail 1008 to the original portion 1004 of the intensity-gain curve 1002 in order to form a completed curve. Here, the tail concatenation function 712 can define the parameterized tail 1008 using multiple knee points 1010 as shown in FIG. 10. The knee points 1010 here are used to define a smooth decay of the intensity-gain curve 1002 beyond the point 1006, and different knee points 1010 may be used to control how fast the intensity-gain curve 1002 beyond the point 1006 decays. Piece-wise line segments 1012 are used in FIG. 10 to illustrate how the knee points 1010 in this example may be used to define the parameterized tail 1008, which results in the creation of a modified intensity-gain curve. This type of processing may be performed by the tail concatenation function 712 for each intensity-gain curve.

The knee points 1010 that are defined here can help to ensure that the resulting intensity-gain curve 1002 includes a parameterized tail such that harsh changes in gain do not occur for small changes in intensity. In some cases, the knee points 1010 may be determined empirically. Also, in some cases, the same knee points 1010 may be used for all intensity-gain curves being processed. However, in other cases, the knee points 1010 can be different for different intensity-gain curves. Further, an input parameter (such as an input 702) may be used to define the minimum allowed value (the point 1006) for each intensity-gain curve. Thus, the same set of knee points 1010 can result in parameterized tails having different shapes in different intensity-gain curves.

Figure 11:
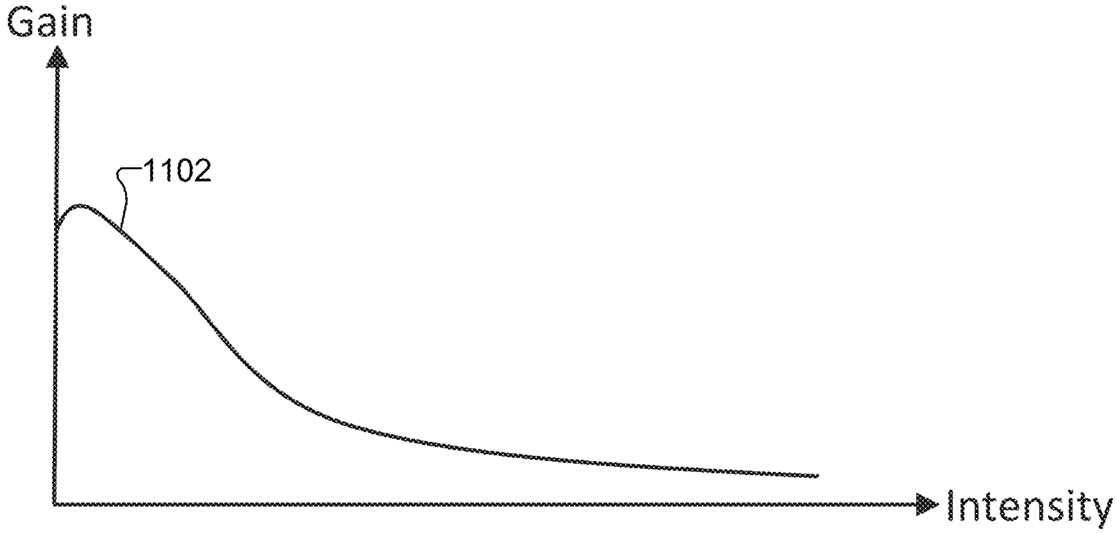

While this can help to reduce artifacts caused by rapid variations in the portion of the intensity-gain curve 1002 beyond the point 1006, rapid variations in the portion 1004 of the intensity-gain curve 1002 can also lead to the creation of halos or other artifacts. Thus, one or more of the intensity-gain curve filtering functions 714 and 716 may be used. For instance, low-pass filtering may be used to remove the rapid variations in the portion 1004 of the intensity-gain curve 1002, as well as to smooth out the overall shape of the intensity-gain curve 1002. This filtering can result in the creation of a finalized intensity-gain curve 1102 as shown in FIG. 11. Again, this type of processing may be performed by the filtering function(s) 714, 716 for each modified intensity-gain curve produced by the tail concatenation function 712 and for each intensity-gain curve not modified by the tail concatenation function 712. Note that the filtering performed across the intensity dimension 604 may allow intensity-gain curves that are adjacent spatially to have significantly different gain values, which may lead to the creation of hard border artifacts or other artifacts. To help compensate for this, the filtering performed across the spatial dimension can help to ensure smoother transitions in the gain values spatially.

Figure 12:
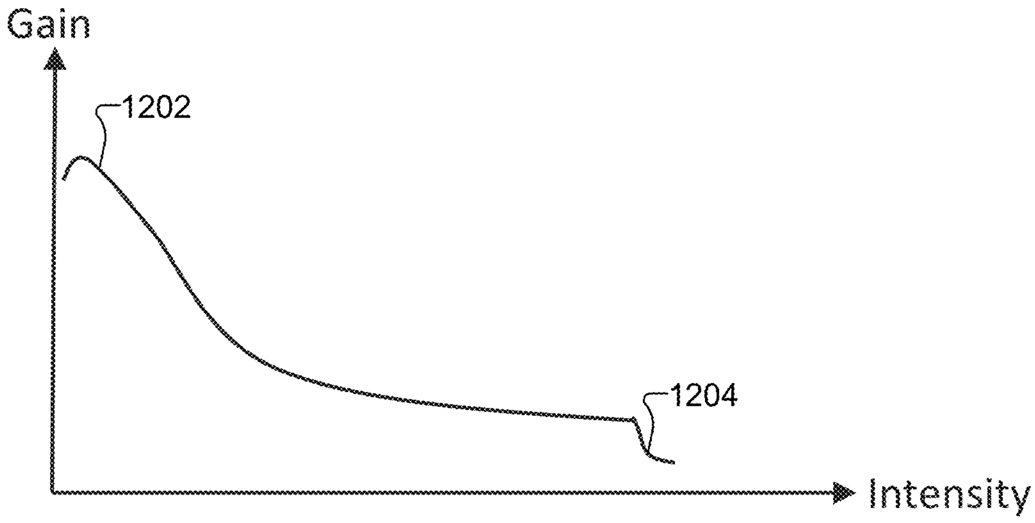
Figure 13:
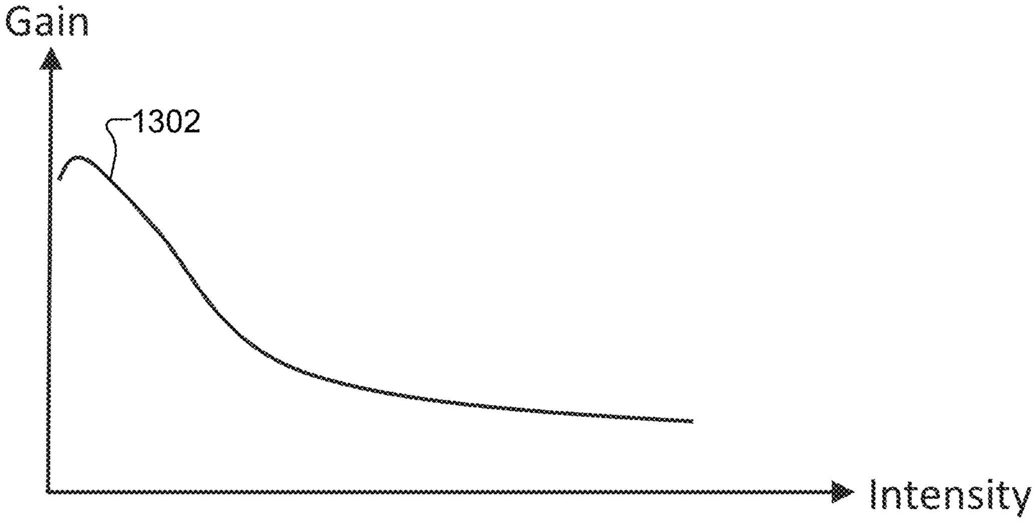

In addition, FIGS. 12 and 13 illustrate how the gradient-based tail smoothing function 718 may be used. As shown in FIG. 12, an intensity-gain curve 1202 includes a parameterized tail in which part of the tail changes rapidly. This may be due to any number of factors, such as the generation of the parameterized tail or the filtering. This condition can be detected by the gradient-based tail smoothing function 718, such as by determining whether the tail of the intensity-gain curve 1202 changes by more than a specified amount within a specified range of intensity values. In other words, the gradient-based tail smoothing function 718 can determine if the intensity-gain curve 1202 has a gradient larger than a specified threshold value. If so, the gradient-based tail smoothing function 718 can apply filtering or other smoothing to the intensity-gain curve 1202, which could lead to the creation of an intensity-gain curve 1302 as shown in FIG. 13.

Using these approaches, the architecture 200 is able to use 2D tone maps to create 3D look-up tables that can be used for tone mapping purposes (although the same or similar approaches may be used to create 3D look-up tables that can be used for other purposes). The 3D look-up tables can be generated using low-complexity techniques, which can make the generation of the 3D look-up tables computationally efficient. In some cases, the 3D look-up tables can also be compliant with one or more relevant specifications, such as the ADOBE DNG specification or other specification.

Although FIGS. 6 through 13 illustrate one example of a process 700 for generating a 3D look-up table 600 in the architecture 200 of FIG. 2, various changes may be made to FIGS. 6 through 13. For example, the 3D lookup table 600 may have gain values at any suitable number of anchor points 602 and for any suitable number of anchor points or bins 602' along the intensity dimension 604. Also, the anchor points 602 may be defined and arranged in any other suitable manner. Further, the specific example of gap filling in FIG. 9 and the specific examples of the intensity-gain curves in FIGS. 10 through 13 can easily vary based on (among other things) the image data being processed and the designs of the filtering functions 714, 716. In addition, the number and positions of the knee points 1010 can easily vary, and the resulting modified intensity-gain curve can vary in any number of ways.

Figure 14:
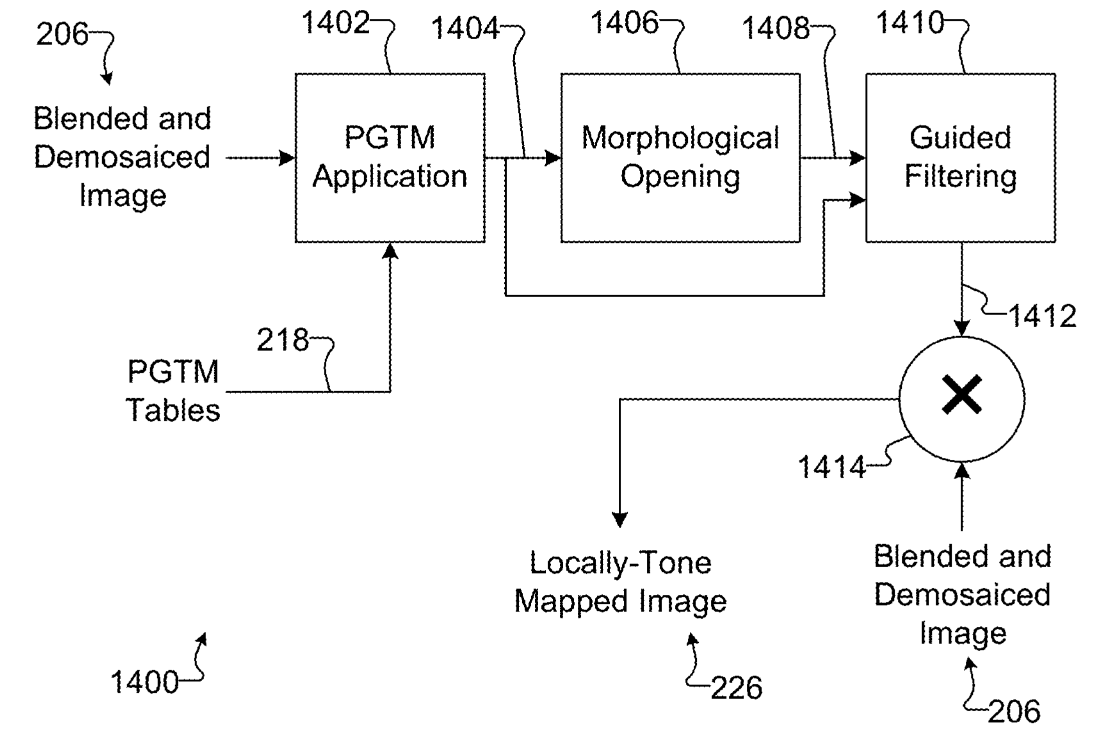
FIG. 14 illustrates an example process for applying a local tone map in the architecture of FIG. 2 in accordance with this disclosure.

FIG. 14 illustrates an example process 1400 for applying a local tone map 218 in the architecture 200 of FIG. 2 in accordance with this disclosure. For ease of explanation, the process 1400 shown in FIG. 14 is described as being implemented on or supported by the electronic device 101 in the network configuration 100 of FIG. 1 using the architecture 200 of FIG. 2. The process 1400 may, for example, be performed as at least part of the local tone mapping application operation 224. However, the process 1400 shown in FIG. 14 could be used with any other suitable device(s) having any other suitable architecture(s) and in any other suitable system(s), such as when the process 1400 is implemented on or supported by the server 106.

As shown in FIG. 14, the blended and demosaiced image 206 and the local tone map 218 are provided to a PGTM application function 1402, which generally operates to adjust the tone of the blended and demosaiced image 206 in various local regions based on the PGTM tables (the local tone map 218). In some embodiments, the PGTM application function 1402 may convert the blended and demosaiced image 206 from the RGB image domain to the luma image domain or the YUV image domain. Once converted, the PGTM application function 1402 can select gain values from the PGTM tables based on the pixels of the converted version of the blended and demosaiced image 206. The selected gain values can be used to generate an initial gain map 1404, which contains the gain values from the PGTM tables to be applied to the blended and demosaiced image 206.

Note that the initial gain map 1404 can have a higher resolution than desired in certain areas, which can potentially lead to the loss of local contrast. This may be problematic in various circumstances, such as when an image includes one or more thin darker structures that are positioned within one or more brighter regions of the image. In those cases, the initial gain map 1404 may identify higher gains for the pixels that include the one or more thin darker structures. If applied, those gains could result in a loss of local contrast since the thin darker structure(s) would be made brighter (and they are positioned within one or more regions of the image that are brighter).

To help compensate for these or other issues, the initial gain map 1404 can be provided to a morphological opening function 1406, which generally operates to smooth gain values associated with thin features in the initial gain map 1404 and generate a revised gain map 1408. The morphological opening function 1406 can implement a morphological transform, such as an erosion operation followed by a dilation operation, to provide this smoothing. The initial gain map 1404 and the revised gain map 1408 are provided to a guided filtering function 1410, which generally operates to filter the initial gain map 1404 using the revised gain map 1408 as a guide. This allows the guided filtering function 1410 to filter the initial gain map 1404 while retaining strong edge information. The result of the guided filtering function 1410 is a final gain map 1412. A multiplication function 1414 multiplies the image data of the blended and demosaiced image 206 with the gain values contained in the final gain map 1412 in order to generate a locally-tone mapped image 226.

Using these approaches, the local tone map 218 (PGTM tables) can be used to apply local tone mapping to the blended and demosaiced image 206. Since the PGTM tables can have low resolution (relative to the blended and demosaiced image 206), the final gain map 1412 generated based on the blended and demosaiced image 206 might otherwise have one or more unwanted properties. However, this can be alleviated using the morphological opening and guided filtering. The blended and demosaiced image 206 is then multiplied by the final gain map 1412, such as in a pixel-wise manner, to obtain the locally-tone mapped image 226.

Although FIG. 14 illustrates one example of a process 1400 for applying a local tone map 218 in the architecture 200 of FIG. 2, various changes may be made to FIG. 14. For example, various components and functions in FIG. 14 may be combined, further subdivided, replicated, rearranged, or omitted according to particular needs. Also, various additional components and functions may be used in FIG. 14.

Figure 15:
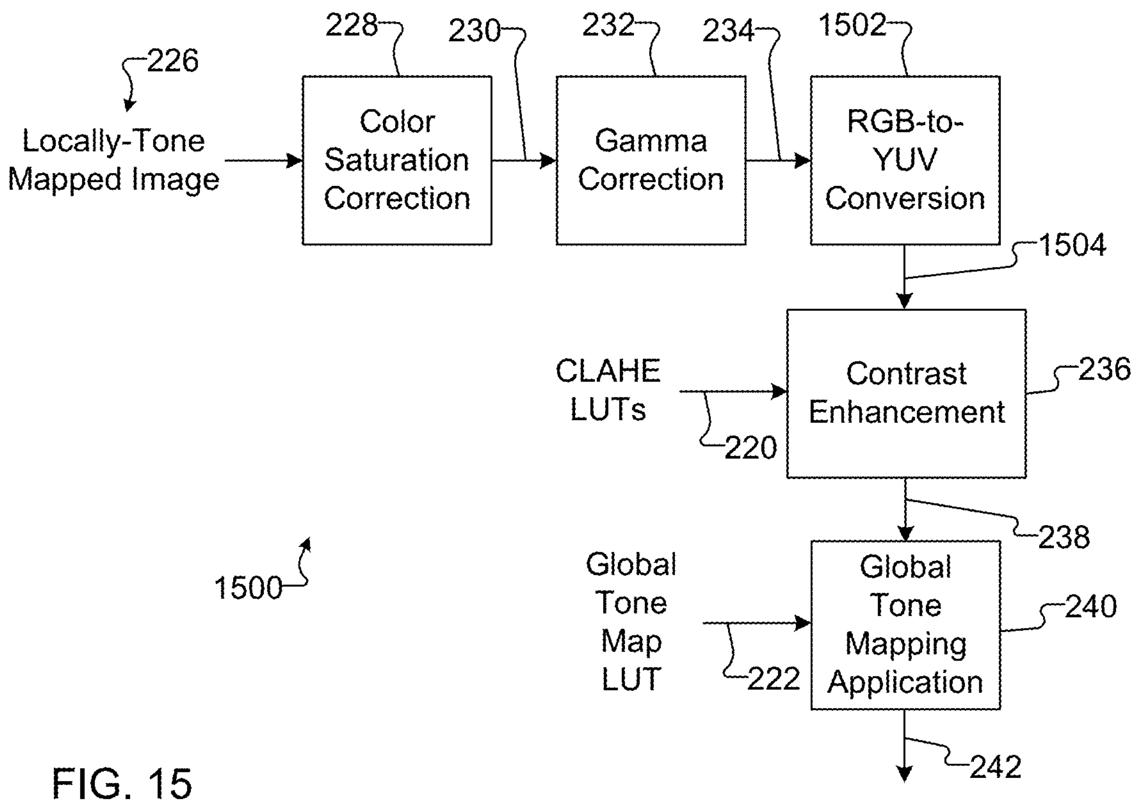
FIGS. 15 and 16 illustrate an example process for applying global tone map LUTs and contrast enhancement LUTs in the architecture of FIG. 2 in accordance with this disclosure.
Figure 16:
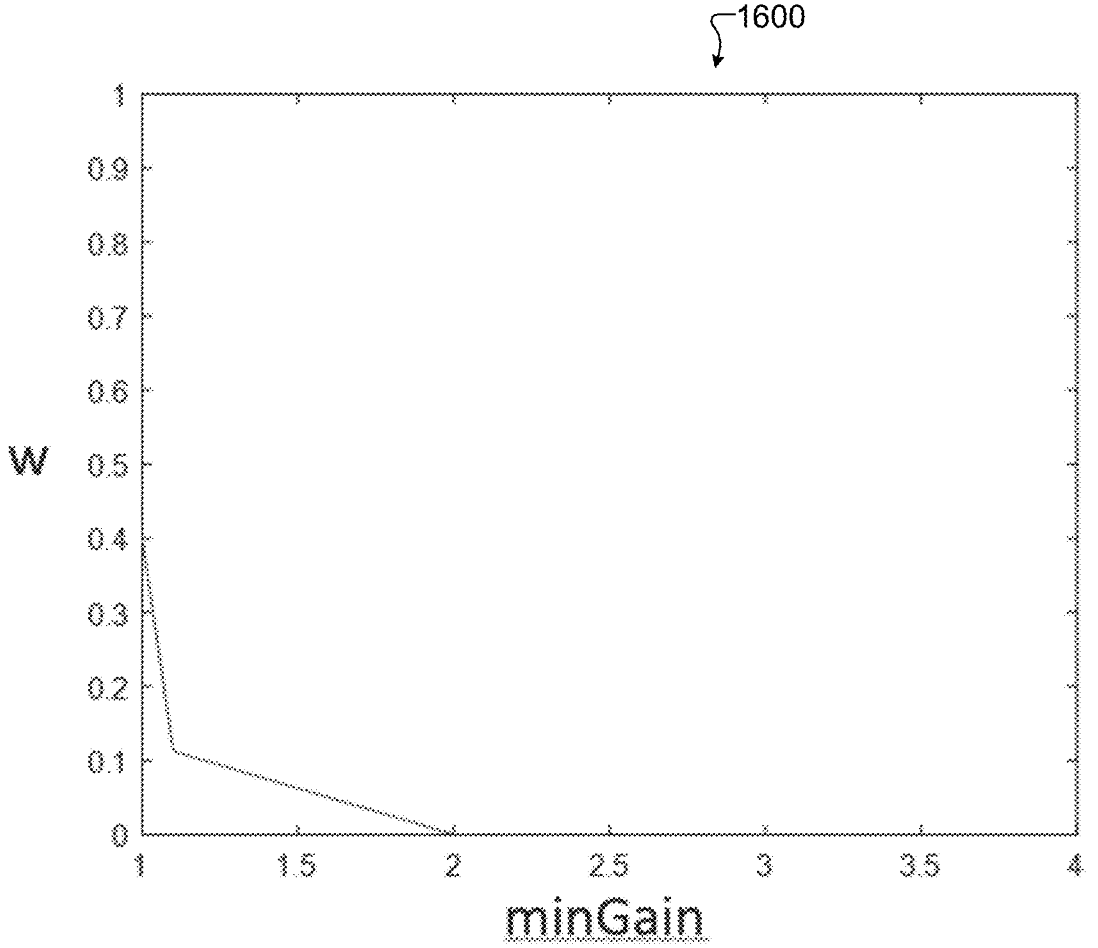

FIGS. 15 and 16 illustrate an example process 1500 for applying global tone map LUTs 222 and contrast enhancement LUTs in 220 the architecture of FIG. 2 in accordance with this disclosure. For ease of explanation, the process 1500 shown in FIGS. 15 and 16 is described as being implemented on or supported by the electronic device 101 in the network configuration 100 of FIG. 1 using the architecture 200 of FIG. 2. The process 1500 may, for example, be performed as at least part of the color saturation correction operation 228, gamma correction operation 232, contrast enhancement operation 236, and global tone mapping application operation 240. However, the process 1500 shown in FIGS. 15 and 16 could be used with any other suitable device(s) having any other suitable architecture(s) and in any other suitable system(s), such as when the process 1500 is implemented on or supported by the server 106.

As shown in FIG. 15, a locally-tone mapped image 226 is provided to the color saturation correction operation 228, which adjusts the color saturation of the locally-tone mapped image 226 in order to generate a corrected locally-tone mapped image 230. The adjustments to the color saturation may be needed for various reasons. For example, the gamma correction operation 232 may introduce some color desaturation, such as in locations where pixel values are already near saturation. The color saturation correction operation 228 can help to reduce or minimize this problem by adjusting the color saturation of the locally-tone mapped image 226 ahead of time to pre-compensate for the subsequent color desaturation caused by the gamma correction. In some cases, the color saturation correction operation 228 can receive and use the same gamma curve that is used by the gamma correction operation 232, such as when the color saturation correction operation 228 uses the gamma curve to predict how the gamma correction operation 232 might result in color desaturation and adjust the color saturation of the locally-tone mapped image 226 to compensate.

After the color saturation adjustment, the resulting corrected locally-tone mapped image 230 is provided to the gamma correction operation 232, which can lower the dynamic range of the corrected locally-tone mapped image 230 and generate a lower-dynamic range image 234. The lower-dynamic range image 234 is provided to an RGB-to-YUV conversion function 1502, which converts the lower-dynamic range image 234 from the RGB image domain to the YUV image domain. This results in the generation of a YUV-domain image 1504. The contrast enhancement operation 236 and the global tone mapping application operation 240 can operate on the luma channel of the YUV-domain image 1504 to respectively perform contrast enhancement and global tone mapping, resulting in the generation of an output image 242.

In some embodiments, the color saturation correction operation 228 may take into consideration non-uniform gains that are inherently applied on color channels because of the gamma correction operation 232. In these cases, the adjustments to the color saturation can be more severe if at least one of the color channels is close to saturation, thereby reducing the minimum gain among the color channels. As a particular example, the color saturation correction operation 228 may operate as follows. For each pixel i of the locally-tone mapped image 226, the color saturation correction operation 228 can calculate color channel gains and identify the minimum gain as follows.

$$GainR(i) = \text{Gamma}(LTMImg(i, 0))/LTMImg(i, 0)$$

$$GainG(i) = \text{Gamma}(LTMImg(i, 1)/LTMImg(i, 1)$$

$$GainB(i) = \text{Gamma}(LTMImg(i, 2)/LTMImg(i, 2)$$

$$minGain(i) = \min(GainR(i), GainG(i), GainB(i))$$

Here, GainR, GainG, and GainB respectively represent the gains associated with the pixel i in the locally-tone mapped image 226. Also, Gamma(•) represents the anticipated operation of the gamma correction operation 232, which may be based on the gamma curve obtained by the color saturation correction operation 228. Further, LTMImg(i,0), LTMImg(i,1), and LTMImg(i,2) respectively represent the red, green, and blue values associated with the pixel i in the color channels of the locally-tone mapped image 226. In addition, minGain(i) represents the smallest of the gains associated with the pixel i in the locally-tone mapped image 226. Ratios involving the smallest gain may be determined as follows.

$$ratioR(i) = minGain/gainR(i)$$

$$ratioG(i) = minGain/gainG(i)$$

$$ratioB(i) = minGain/gainB(i)$$

Values of the pixel i in the color channels forming the corrected locally-tone mapped image 230 may be defined as follows.

$$ColSatImg(i, 0) = (ratioR(i) \times w + 1.0 \times (1.0 - w)) \times LTMImg(i, 0)$$

$$ColSatImg(i, 1) = (ratioG(i) \times w + 1.0 \times (1.0 - w)) \times LTMImg(i, 1)$$

$$ColSatImg(i, 2) = (ratioB(i) \times w + 1.0 \times (1.0 - w)) \times LTMImg(i, 2)$$

Here, ColSatImg(i,0), ColSatImg(i,1), and ColSatImg(i,2) respectively represent the red, green, and blue values associated with the pixel i in the color channels of the corrected locally-tone mapped image 230. Also, w represents a weight applied to the ratio values in order to control how much of the ratio values are applied to the LTMImg(i,0), LTMImg (i,1), and LTMImg(i,2) values. In particular embodiments, the weight w that is applied here can be based on the minimum gain minGain(i). For example, as shown in FIG. 16, a graph 1600 illustrates how the minimum gain minGain (i) can be used to select the weight w applied to the pixel i. In this example, the graph 1600 plots a two-segment curve, although other curves may be used. Here, the graph indicates that larger weights w are applied when the minimum gain minGain(i) is lower, which can result in more color saturation adjustments being applied when the minimum gain is low. Little or no color saturation adjustments may be applied when the minimum gain is higher (since this is indicative of a pixel in at least one color channel already being near saturation).

Using these approaches, the color saturation correction operation 228 can be used to improve the color saturation of the output image 242. Here, the locally-tone mapped image 226 (after going through gamma correction) might have some color desaturation. To counter this, the color saturation correction operation 228 is used before the gamma correction operation 232 to bring the color channels back to the desired saturation levels. The resulting lower-dynamic range image 234 is converted to the YUV image domain, and the contrast enhancement and the global tone mapping can be applied in the YUV image domain.

Although FIGS. 15 and 16 illustrate one example of a process 1500 for applying global tone map LUTs 222 and contrast enhancement LUTs 220 in the architecture 200 of FIG. 2 and related details, various changes may be made to FIGS. 15 and 16. For example, various components and functions in FIG. 15 may be combined, further subdivided, replicated, rearranged, or omitted according to particular needs. Also, various additional components and functions may be used in FIG. 15. In addition, the minimum gain-weight curve shown in the graph 1600 of FIG. 16 may vary depending on the implementation.

Figure 17:
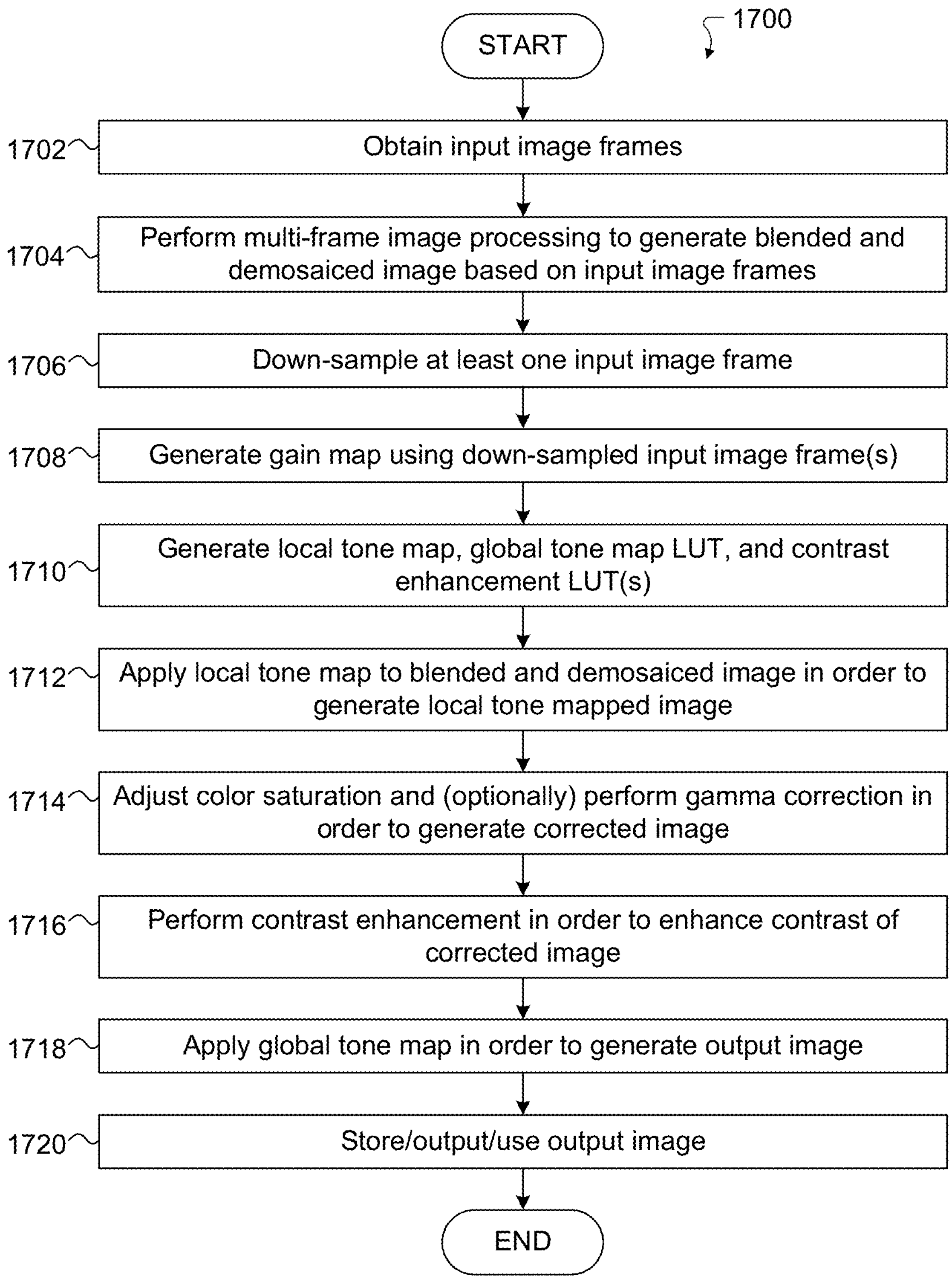
FIG. 17 illustrates an example method for tone mapping in a high-resolution imaging system in accordance with this disclosure.

FIG. 17 illustrates an example method 1700 for tone mapping in a high-resolution imaging system in accordance with this disclosure. For ease of explanation, the method 1700 shown in FIG. 17 is described as being performed by the electronic device 101 in the network configuration 100 of FIG. 1 using the architecture 200 shown in FIG. 2. However, the method 1700 shown in FIG. 17 could be performed using any other suitable device(s) having any other suitable architecture(s) and in any other suitable system(s), such as when the method 1700 is performed by the server 106.

As shown in FIG. 17, multiple input image frames are obtained at step 1702. This may include, for example, the processor 120 of the electronic device 101 obtaining raw input image frames or other input image frames 202, such as from one or more imaging sensors 180 of the electronic device 101. Multi-frame image processing is performed to generate a blended and demosaiced image based on the input image frames at step 1704. This may include, for example, the processor 120 of the electronic device 101 using the multi-frame image processing pipeline 204 to perform blending, demosaicing, and other operations to combine the input image frames 202 and generate the blended and demosaiced image 206.

Information used for tone mapping is generated based on at least one of the image frames and one or more parameters of the at least one imaging sensor. For instance, at least one of the input image frames is down-sampled at step 1706. This may include, for example, the processor 120 of the electronic device 101 performing the down-sampling operation 208 using one or more of the input image frames 202 in order to generate one or more down-sampled image frames 210. A gain map is generated using the one or more down-sampled image frames at step 1708. This may include, for example, the processor 120 of the electronic device 101 performing the gain map generation operation 212 to generate the gain map 214 using the down-sampled image frame 210. In some cases, the gain map 214 can be generated using a single down-sampled image frame 210 for a selected input image frame 202. As a particular example, the gain map 214 may be generated by converting the down-sampled image frame 210 into the single luma channel image, applying local tone mapping to the single luma channel image to generate the tone mapped image 304, and determining gain values of the gain map 214 based on ratios of values in the tone mapped image 304 and values in the single luma channel image.

A local tone map, a global tone map LUT, and one or more contrast enhancement LUTs are generated at step 1710. This may include, for example, the processor 120 of the electronic device 101 performing the tone map LUT generation operation 216 to generate the local tone map 218, the global tone map LUT 222, and the one or more contrast enhancement LUTs 220. In some cases, the local tone map 218 can be generated by dividing the gain map 214 into multiple tiles 308 and determining intensity-gain curves 312 for the tiles 308 (where the intensity-gain curves 312 can be used to form the 3D look-up table 600). As a particular example, the 3D look-up table 600 may be generated by determining gain values for locations of a PGTM and filling in one or more gaps of the PGTM to form initial intensity-gain curves, concatenating each of one or more intensity-gain curves with a parameterized tail (if needed), filtering the intensity-gain curves in intensity and spatial dimensions, and smoothing the parameterized tail of any intensity-gain curve having a parameterized tail with a gradient larger than a threshold. The one or more contrast enhancement LUTs 220 may be generated based on the tone mapped image 304. The global tone map LUT 222 may be generated based on the one or more parameters of the at least one imaging sensor 180.

The local tone map is applied to the blended and demosaiced image to generate a local tone mapped image at step 1712. This may include, for example, the processor 120 of the electronic device 101 performing the local tone mapping application operation 224 to apply the local tone map 218 to the blended and demosaiced image 206 in order to generate the locally-tone mapped image 226. In some cases, this may include applying the local tone map 218 to the blended and demosaiced image 206 to generate the initial gain map 1404, performing morphological opening to generate the revised gain map 1408, performing guided filtering to generate the final gain map 1412, and generating the locally-tone mapped image 226 using the blended and demosaiced image 206 and the final gain map 1412.

The color saturation of the local tone mapped image is adjusted and gamma correction is optionally performed to generate a corrected image at step 1714. This may include, for example, the processor 120 of the electronic device 101 performing the color saturation correction operation 228 in order to modify the color saturation of the locally-tone mapped image 226 (if needed) and generate the corrected locally-tone mapped image 230. This may also optionally include the processor 120 of the electronic device 101 performing the gamma correction operation 232 to lower the dynamic range of the corrected locally-tone mapped image 230 and generate the lower-dynamic range image 234.

Contrast enhancement is performed in order to enhance the contrast of the corrected image at step 1716, and global tone mapping is performed to generate an output image at step 1718. This may include, for example, the processor 120 of the electronic device 101 performing the contrast enhancement operation 236 using the one or more contrast enhancement LUTs 220 in order to adjust the contrast within the lower-dynamic range image 234 and generate the contrast-enhanced image 238. This may also include the processor 120 of the electronic device 101 performing the global tone mapping application operation 240 to apply the global tone map LUT 222 to the image data of the contrast-enhanced image 238 and generate the output image 242.

The output image is stored, output, or used in some manner at step 1720. For example, the output image 242 may be displayed on a display 160 of the electronic device 101, saved to a camera roll stored in a memory 130 of the electronic device 101, or attached to a text message, email, or other communication to be transmitted from the electronic device 101. Of course, the output image 242 could be used in any other or additional manner.

Although FIG. 17 illustrates one example of a method 1700 for tone mapping in a high-resolution imaging system, various changes may be made to FIG. 17. For example, while shown as a series of steps, various steps in FIG. 17 may overlap, occur in parallel, occur in a different order, or occur any number of times. As a particular example, steps 1706-1710 may occur partially or completely in parallel with step 1702 in order to reduce the processing time needed to generate the output image 242.

It should be noted that the functions shown in or described with respect to FIGS. 2 through 17 can be implemented in an electronic device 101, server 106, or other device in any suitable manner. For example, in some embodiments, at least some of the functions shown in or described with respect to FIGS. 2 through 17 can be implemented or supported using one or more software applications or other software instructions that are executed by the processor 120 of the electronic device 101, server 106, or other device. In other embodiments, at least some of the functions shown in or described with respect to FIGS. 2 through 17 can be implemented or supported using dedicated hardware components. In general, the functions shown in or described with respect to FIGS. 2 through 17 can be performed using any suitable hardware or any suitable combination of hardware and software/firmware instructions. Also, the functions shown in or described with respect to FIGS. 2 through 17 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

obtaining multiple image frames captured using at least one imaging sensor;

generating at least partially in parallel:

a local tone map and one or more contrast enhancement look-up tables (LUTs) based on a down-sampled version of a specified one of the image frames;

a global tone map LUT based on one or more parameters of the at least one imaging sensor; and a blended and demosaiced image based on the image frames;

generating a local tone mapped image based on the blended and demosaiced image and the local tone map;

adjusting color saturation based on the local tone mapped image to generate a corrected image; and generating an output image based on the corrected image, the global tone map LUT, and the one or more contrast enhancement LUTs.

2. The method of claim 1, wherein generating the local tone map comprises:

selecting the specified one of the image frames;

generating a gain map based on the selected image frame;

dividing the gain map into multiple tiles; and generating a three-dimensional (3D) LUT using the tiles.

3. The method of claim 2, wherein generating the gain map comprises:

down-sampling the selected image frame to generate the down-sampled version of the specified image frame;

converting the down-sampled version of the specified image frame into a single luma channel image;

applying local tone mapping to the single luma channel image to generate a tone mapped image; and determining gain values of the gain map based on ratios of values in the tone mapped image and values in the single luma channel image.

4. The method of claim 3, wherein generating the one or more contrast enhancement LUTs comprises generating the one or more contrast enhancement LUTs based on the tone mapped image.

5. The method of claim 2, wherein generating the 3D LUT comprises:

determining gain values for locations of a profile gain table map (PGTM);

filling in one or more gaps of the PGTM, each gap associated with a gain value that is initially missing in the PGTM due to a lack of image data, the PGTM defining intensity-gain curves;

for one or more of the intensity-gain curves that end prematurely, concatenating each of the one or more intensity-gain curves with a parameterized tail;

filtering the intensity-gain curves in an intensity dimension and in a spatial dimension; and for at least one of the intensity-gain curves having a parameterized tail with a gradient larger than a threshold, smoothing the parameterized tail.

6. The method of claim 1, wherein generating the local tone mapped image comprises:

applying the local tone map to the blended and demosaiced image to generate a first gain map;

performing a morphological opening operation using the first gain map to generate a second gain map;

performing a guided filtering operation using the first and second gain maps to generate a third gain map; and generating the local tone mapped image using the blended and demosaiced image and the third gain map.

7. The method of claim 1, wherein:

the color saturation is adjusted prior to performing a gamma correction;

the corrected image undergoes the gamma correction and is converted from a red-green-blue (RGB) image domain to a luma-chroma (YUV) image domain; and generating the output image comprises applying contrast enhancement using the one or more contrast enhancement LUTs and applying global tone mapping using the global tone map LUT to a luma channel in the YUV image domain.

8. An electronic device comprising:

at least one imaging sensor configured to capture multiple image frames; and at least one processing device configured to:

generate at least partially in parallel:

a local tone map and one or more contrast enhancement look-up tables (LUTs) based on a down-sampled version of a specified one of the image frames;

a global tone map LUT based on one or more parameters of the at least one imaging sensor; and a blended and demosaiced image based on the image frames;

generate a local tone mapped image based on the blended and demosaiced image and the local tone map;

adjust color saturation based on the local tone mapped image to generate a corrected image; and generate an output image based on the corrected image, the global tone map LUT, and the one or more contrast enhancement LUTs.

9. The electronic device of claim 8, wherein, to generate the local tone map, the at least one processing device is configured to:

select the specified one of the image frames;

generate a gain map based on the selected image frame;

divide the gain map into multiple tiles; and generate a three-dimensional (3D) LUT using the tiles.

10. The electronic device of claim 9, wherein, to generate the gain map, the at least one processing device is configured to:

down-sample the selected image frame to generate the down-sampled version of the specified image frame;

convert the down-sampled version of the specified image frame into a single luma channel image;

apply local tone mapping to the single luma channel image to generate a tone mapped image; and determine gain values of the gain map based on ratios of values in the tone mapped image and values in the single luma channel image.

11. The electronic device of claim 9, wherein, to generate the 3D LUT, the at least one processing device is configured to:

determine gain values for locations of a profile gain table map (PGTM);

fill in one or more gaps of the PGTM, each gap associated with a gain value that is initially missing in the PGTM due to a lack of image data, the PGTM defining intensity-gain curves;

for one or more of the intensity-gain curves that end prematurely, concatenate each of the one or more intensity-gain curves with a parameterized tail;

filter the intensity-gain curves in an intensity dimension and in a spatial dimension; and for at least one of the intensity-gain curves having a parameterized tail with a gradient larger than a threshold, smooth the parameterized tail.

12. The electronic device of claim 8, wherein the at least one processing device is configured to generate the global tone map LUT based on the one or more parameters of the at least one imaging sensor.

13. The electronic device of claim 8, wherein, to generate the local tone mapped image, the at least one processing device is configured to:

apply the local tone map to the blended and demosaiced image to generate a first gain map;

perform a morphological opening operation using the first gain map to generate a second gain map;

perform a guided filtering operation using the first and second gain maps to generate a third gain map; and generate the local tone mapped image using the blended and demosaiced image and the third gain map.

14. The electronic device of claim 8, wherein:

the at least one processing device is configured to adjust the color saturation prior to performing a gamma correction;

the at least one processing device is further configured to apply the gamma correction to the corrected image and convert from a red-green-blue (RGB) image domain to a luma-chroma (YUV) image domain; and to generate the output image, the at least one processing device is configured to apply contrast enhancement using the one or more contrast enhancement LUTs and apply global tone mapping using the global tone map LUT to a luma channel in the YUV image domain.

15. A non-transitory machine readable medium containing instructions that when executed cause at least one processor of an electronic device to:

obtain multiple image frames captured using at least one imaging sensor;

generate at least partially in parallel:

a local tone map and one or more contrast enhancement look-up tables (LUTs) based on a down-sampled version of a specified one of the image frames;

a global tone map LUT based on one or more parameters of the at least one imaging sensor; and a blended and demosaiced image based on the image frames;

generate a local tone mapped image based on the blended and demosaiced image and the local tone map;

adjust color saturation based on the local tone mapped image to generate a corrected image; and generate an output image based on the corrected image, the global tone map LUT, and the one or more contrast enhancement LUTs.

16. The non-transitory machine readable medium of claim 15, wherein:

the instructions that when executed cause the at least one processor to generate the local tone map comprise instructions that when executed cause the at least one processor to:

select the specified one of the image frames;

generate a gain map based on the selected image frame;

divide the gain map into multiple tiles; and generate a three-dimensional (3D) LUT using the tiles;

the instructions that when executed cause the at least one processor to generate the gain map comprise instructions that when executed cause the at least one processor to:

down-sample the selected image frame to generate the down-sampled version of the specified image frame;

convert the down-sampled version of the specified image frame into a single luma channel image;

apply local tone mapping to the single luma channel image to generate a tone mapped image; and determine gain values of the gain map based on ratios of values in the tone mapped image and values in the single luma channel image; and the instructions that when executed cause the at least one processor to generate the one or more contrast enhancement LUTs comprise instructions that when executed cause the at least one processor to generate the one or more contrast enhancement LUTs based on the tone mapped image.

17. The non-transitory machine readable medium of claim 16, wherein the instructions that when executed cause the at least one processor to generate the 3D LUT comprise instructions that when executed cause the at least one processor to:

determine gain values for locations of a profile gain table map (PGTM);

fill in one or more gaps of the PGTM, each gap associated with a gain value that is initially missing in the PGTM due to a lack of image data, the PGTM defining intensity-gain curves;

for one or more of the intensity-gain curves that end prematurely, concatenate each of the one or more intensity-gain curves with a parameterized tail;

filter the intensity-gain curves in an intensity dimension and in a spatial dimension; and for at least one of the intensity-gain curves having a parameterized tail with a gradient larger than a threshold, smooth the parameterized tail.

18. The non-transitory machine readable medium of claim 15, wherein the instructions that when executed cause the at least one processor to generate the local tone mapped image comprise instructions that when executed cause the at least one processor to:

apply the local tone map to the blended and demosaiced image to generate a first gain map;

perform a morphological opening operation using the first gain map to generate a second gain map;

perform a guided filtering operation using the first and second gain maps to generate a third gain map; and generate the local tone mapped image using the blended and demosaiced image and the third gain map.

19. The method of claim 1, wherein adjusting the color saturation based on the local tone mapped image comprises:

receiving a gamma curve associated with a gamma correction operation to be applied;

for each pixel of the local tone mapped image, calculating a per-channel gain for each color channel of the pixel based on applying the gamma curve to a value of that color channel and dividing by the value of that color channel;

identifying a minimum gain among the per-channel gains for the pixel;

determining per-channel ratios based on the minimum gain and each per-channel gain; and applying the per-channel ratios to color channel values of the pixel using a weight that is based on the minimum gain, wherein a larger weight is applied when the minimum gain is lower.

20. The electronic device of claim 8, wherein, to adjust the color saturation based on the local tone mapped image, the at least one processing device is configured to:

receive a gamma curve associated with a gamma correction operation to be applied;

for each pixel of the local tone mapped image, calculate a per-channel gain for each color channel of the pixel based on applying the gamma curve to a value of that color channel and dividing by the value of that color channel;

identify a minimum gain among the per-channel gains for the pixel;

determine per-channel ratios based on the minimum gain and each per-channel gain; and apply the per-channel ratios to color channel values of the pixel using a weight that is based on the minimum gain, wherein a larger weight is applied when the minimum gain is lower.

* * * * *